United States Patent
Chen

(10) Patent No.: US 10,404,576 B2
(45) Date of Patent: Sep. 3, 2019

(54) CONSTRAINED SHORTEST PATH DETERMINATION IN A NETWORK

(71) Applicant: Futurewei Technologies, Inc., Plano, TX (US)

(72) Inventor: Huaimo Chen, Bolton, MA (US)

(73) Assignee: Futurewei Technologies, Inc., Plano, TX (US)

( * ) Notice: Subject to any disclaimer, the term of this patent is extended or adjusted under 35 U.S.C. 154(b) by 34 days.

(21) Appl. No.: 15/730,362

(22) Filed: Oct. 11, 2017

(65) Prior Publication Data

US 2018/0109439 A1    Apr. 19, 2018

Related U.S. Application Data

(60) Provisional application No. 62/407,553, filed on Oct. 13, 2016.

(51) Int. Cl.
| | | |
|---|---|---|
| *H04L 12/721* | (2013.01) | |
| *H04L 12/729* | (2013.01) | |
| *H04L 12/733* | (2013.01) | |
| *H04L 12/751* | (2013.01) | |

(52) U.S. Cl.
CPC .......... *H04L 45/124* (2013.01); *H04L 45/02* (2013.01); *H04L 45/122* (2013.01); *H04L 45/125* (2013.01); *H04L 45/20* (2013.01)

(58) Field of Classification Search
CPC ..... H04L 45/02; H04L 45/122; H04L 45/124; H04L 45/125; H04L 45/20
See application file for complete search history.

(56) References Cited

U.S. PATENT DOCUMENTS

| | | | | |
|---|---|---|---|---|
| 6,256,309 B1* | 7/2001 | Daley | ..................... | H04L 45/00 370/395.43 |
| 6,347,078 B1* | 2/2002 | Narvaez-Guarnieri | ..................... | H04L 45/00 370/230 |
| 6,529,498 B1* | 3/2003 | Cheng | .................. | H04L 12/185 370/351 |
| 6,563,798 B1* | 5/2003 | Cheng | ..................... | H04L 45/00 370/255 |

(Continued)

OTHER PUBLICATIONS

Moy, J., "OSPF Version 2", Request for Comments: 1583, Network Working Group, (Mar. 1994), 132 pgs.

(Continued)

*Primary Examiner* — Steven H Nguyen
(74) *Attorney, Agent, or Firm* — Schwegman Lundberg & Woessner, P.A.

(57) ABSTRACT

A method of determining a plurality of shortest paths in a network from a source node to respective destination nodes comprises: accessing, by one or more processors, for each of the plurality of shortest paths, a path constraint; generating, by the one or more processors, a shortest path tree (SPT) and a candidate list, wherein each candidate of the candidate list comprises a working node, a minimum cost for a path to the working node from the source node, a maximum available bandwidth for the path to the working node from the source node, and a previous hop node; and determining, by the one or more processors, the plurality of shortest paths in the network from the source node to the respective destination nodes based on the SPT, each determined shortest path meeting the path constraint.

20 Claims, 19 Drawing Sheets

(56) References Cited

U.S. PATENT DOCUMENTS

| | | | |
|---|---|---|---|
| 6,704,320 B1* | 3/2004 | Narvaez | H04L 45/02 370/408 |
| 6,717,920 B1* | 4/2004 | Cheng | H04L 45/00 370/255 |
| 7,301,911 B2* | 11/2007 | Mack-Crane | H04J 3/14 370/254 |
| 7,362,709 B1* | 4/2008 | Hui | H04L 45/00 370/221 |
| 9,231,851 B2 | 1/2016 | Chen | |
| 2001/0032272 A1* | 10/2001 | Fujita | H04L 45/12 709/241 |
| 2012/0124236 A1* | 5/2012 | Mack-Crane | H04J 3/14 709/238 |
| 2013/0024107 A1* | 1/2013 | Xie | G01C 21/3461 701/423 |
| 2017/0163443 A1* | 6/2017 | Chen | H04L 12/4633 |

OTHER PUBLICATIONS

Vasseur, J. P., et al., "A Backward-Recursive PCE-Based Computation (BRPC) Procedure to Compute Shortest Constrained Inter-Domain Traffic EngineeringLabel Switched Paths", Request for Comments: 5441, Network Working Group, © 2009 IETF Trust, (2009), 1-19.

Younis, Ossama, et al., "Constraint-Based Routing in the Internet: Basic Principles and Recent Research", *IEEE Communications Surveys & Tutorials*, 5(1), (2003), 2-13.

* cited by examiner

US 10,404,576 B2

CONSTRAINED SHORTEST PATH DETERMINATION IN A NETWORK

PRIORITY CLAIM

The application claims priority to U.S. Provisional Patent Application No. 62/407,553, filed Oct. 13, 2016, entitled "Constrained Shortest Path Determination in a Network," which is incorporated herein by reference in its entirety.

FIELD OF THE INVENTION

The present disclosure is related to computer network architecture, and in particular to finding a shortest path from a source to a destination in the computer network architecture.

BACKGROUND

Computer networks support increasing numbers of services and endpoints. As a result, networks have increasing numbers of nodes. An increase in the number of nodes in a network results in an increased number of path computations to determine how data should be routed between the nodes. The path computations may be constrained based on quality of service, policy, or price.

The performance of a constrained shortest path computation algorithm used in routers or software defined networking (SDN) controllers has a critical impact on the performance of the routers or controllers. This performance impact affects the scalability and performance of the network. For SDN controllers, the impact is particularly significant since all the constrained path computations are typically done at a single SDN controller.

SUMMARY

Various examples are now described to introduce a selection of concepts in a simplified form that are further described below in the detailed description. The Summary is not intended to identify key or essential features of the claimed subject matter, nor is it intended to be used to limit the scope of the claimed subject matter.

According to one aspect of the present disclosure, a computer-implemented method for determining a plurality of shortest paths in a network from a source node to respective destination nodes is provided that comprises, comprising: accessing, by one or more processors, for each of the plurality of shortest paths, a path constraint; generating, by the one or more processors, a shortest path tree (SPT) and a candidate list, wherein each candidate of the candidate list comprises a working node, a minimum cost for a path to the working node from the source node, a maximum available bandwidth for the path to the working node from the source node, and a previous hop node; and determining, by the one or more processors, the plurality of shortest paths in the network from the source node to the respective destination nodes based on the SPT, each determined shortest path meeting the path constraint.

Optionally, in any of the preceding aspects, a first candidate of the candidate list comprises: a working node that is a first node in the network connected to a second node in the network through a link that is in the SPT; a minimum cost to the working node from the source node that is a minimum cost to the second node plus a cost of the link; a maximum available bandwidth for the path to the working node from the source node that is the lesser of an available bandwidth of the link and a maximum available bandwidth to the second node; and a previous hop node that is the second node.

Optionally, in any of the preceding aspects, the SPT is initially empty; the candidate list initially comprises an initial candidate; and the initial candidate comprises: a working node that is the source node; a minimum cost to the working node from the source node that is zero; a maximum available bandwidth for the path to the working node from the source node that is a maximum number in a computer; and a previous hop node that is none.

Optionally, in any of the preceding aspects, the method further comprises: for each of the destination nodes, adding a destination mark to a data structure corresponding to the destination node; and selecting a lowest constraint from the path constraints.

Optionally, in any of the preceding aspects, the path constraints are bandwidth constraints; and selecting the lowest constraint from the path constraints comprises selecting the lowest bandwidth constraint from among the bandwidth constraints.

Optionally, in any of the preceding aspects, the method further comprises: removing the destination mark from the data structure corresponding to a destination node when a shortest path from the source node to the destination node having a destination mark is found and satisfies the associated constraint for the shortest path; and updating a data structure that represents available bandwidth of each link along the shortest path from the source node to the destination node by subtracting the bandwidth constraint associated with the shortest path from the available bandwidth of the link; determining that a link of the links along the shortest path from the source node to the destination node has an available bandwidth less than the lowest bandwidth constraint; and based on the determination that the link has the available bandwidth less than the lowest bandwidth constraint, setting the shortest path tree to empty and the candidate list to have only one element corresponding to the source node.

Optionally, in any of the preceding aspects, wherein the determining of the plurality of shortest paths in the network from the source node to the respective destination nodes is based on a candidate being added into the SPT that contains a working node with a destination mark and the constraint associated with the shortest path from the source node to the working node being satisfied.

Optionally, in any of the preceding aspects, the SPT represents a plurality of links between a plurality of sources and a destination; and each of the plurality of sources is marked as a destination.

Optionally, in any of the preceding aspects, the method further comprises: selecting a candidate from the candidate list, wherein the candidate selected has a minimum cost that is a lowest value among the minimum costs of candidates in the list; removing the candidate selected from the candidate list; and adding the working node of the selected candidate into the SPT.

Optionally, in any of the preceding aspects, the method further comprises: updating the candidate list by: for each node that is connected by a link to the added node in the SPT and is not an ancestor of the added node in the SPT: constructing a new candidate with: the node as the working node, the added node as the previous hop node, the minimum cost to the added node from the source node plus a cost of a link from the added node to the working node as the minimum cost for the path to the working node from the source node, and the smaller of an available bandwidth of the link to the working node from the added node and the maximum bandwidth to the added node from the source node as the maximum bandwidth to the working node; and adding the new candidate into the candidate list unless there is an existing candidate with said node as the working node in the candidate list.

Optionally, in any of the preceding aspects, the updating of the candidate list further comprises: replacing the existing candidate with the new candidate and storing the existing candidate as an alternative under the new candidate when the existing candidate with the node is in the candidate list and the cost to the node of the new candidate is less than that of the existing candidate; and saving the new candidate as an alternative path under the existing candidate when the existing candidate with the node is in the candidate list and the cost to the node of the new candidate is not less than that of the existing candidate.

Optionally, in any of the preceding aspects, the method further comprises: based on a determination that a link between a first node and a second node in the SPT has an available bandwidth less than the lowest bandwidth constraint: removing, from the SPT, a set of nodes composed of the second node and each node descended the second node; removing, from the candidate list, a candidate with a previous hop node in the set of nodes; and promoting, in the candidate list, an alternative candidate for the removed candidate to a new candidate.

Optionally, in any of the preceding aspects, the method further comprises: maintaining a maximum reserved link bandwidth (MRLB), initially set to zero; and maintaining a minimum available link bandwidth (MALB), initially set to a maximum number.

Optionally, in any of the preceding aspects, the method further comprises: in response to finding a shortest path with an associated bandwidth constraint, increasing the MRLB by the bandwidth of the associated bandwidth constraint; in response to adding a candidate to the candidate list, setting the MALB to the smaller of the maximum available bandwidth for the path to the working node of the added candidate and the MALB; and in response to determining that the MRLB plus the lowest bandwidth constraint is greater than the MALB, reducing an available bandwidth of links along each shortest path found by the path constraint bandwidth associated with the path.

Optionally, in any of the preceding aspects, the generating of the candidate list comprises generating the candidate list with a first candidate element, wherein the working node of the first candidate element is a first node connected to the source node by a first link, the minimum cost for the path to the working node from the source node is a cost associated with the first link, the maximum available bandwidth for the path to the working node from the source node is a bandwidth associated with the first link, and the previous hop node is the source node; the generating of the SPT comprises adding a root element to a shortest path tree, the root element representing the source node; and the determining of the shortest paths in the network from the source node to the destination nodes comprises: removing the first candidate element from the candidate list; adding a first element to the SPT as a child element of the root element, the first element corresponding to the first node; determining a second node connected to the first node by a second link, the second node not having a corresponding element in the SPT that is an ancestor of the first element; adding a second candidate element to the candidate list, wherein the working node is the second node and the previous hop node is the first node; adding a second element to the SPT that corresponds to a first destination node of the destination nodes; and based on a sequence of elements of the SPT from the root element to the second element, assigning a shortest path from the root element to the first destination node.

According to one aspect of the present disclosure, a system for determining a plurality of shortest paths in a network from a source node to respective destination nodes is provided that comprises: a non-transitory memory storage comprising instructions; and one or more processors in communication with the memory storage and a plurality of network nodes, wherein the one or more processors execute the instructions to: accessing, for each of the plurality of shortest paths, a path constraint; generating a shortest path tree (SPT) and a candidate list, wherein each candidate of the candidate list comprises a working node, a minimum cost for a path to the working node from the source node, a maximum available bandwidth for the path to the working node from the source node, and a previous hop node; and determining the plurality of shortest paths in the network from the source node to the respective destination nodes based on the SPT, each determined shortest path meeting the path constraint.

Optionally, in any of the preceding aspects, a first candidate of the candidate list comprises: a working node that is a first node in the network connected to a second node in the network through a link that is in the SPT; a minimum cost to the working node that is a minimum cost to the second node plus a cost of the link; a maximum available bandwidth for the path to the working node from the source node that is the lesser of an available bandwidth of the link and a maximum available bandwidth to the second node; and a previous hop node that is the second node.

Optionally, in any of the preceding aspects, the SPT is initially empty; the candidate list initially comprises an initial candidate; and the initial candidate comprises: a working node is that the source node; a minimum cost to the working node that is zero; a maximum available bandwidth that is a maximum number in a computer; and a previous hop node that is none.

Optionally, in any of the preceding aspects, the one or more processors further perform: for each of the destination nodes, adding a destination mark to a data structure corresponding to the destination node; and selecting a lowest constraint from the path constraints.

According to one aspect of the present disclosure, a non-transitory computer-readable media storing computer instructions for determining a plurality of shortest paths in a network from a source node to respective destination nodes is provided, that when executed by one or more processors, cause the one or more processors to perform the steps of: accessing, for each of the plurality of shortest paths, a path constraint; generating a shortest path tree (SPT) and a candidate list, wherein each candidate of the candidate list comprises a working node, a minimum cost for a path to the working node from the source node, a maximum available bandwidth for the path to the working node from the source node, and a previous hop node; and determining the plurality of shortest paths in the network from the source node to the respective destination nodes based on the SPT, each determined shortest path meeting the path constraint.

Any one of the foregoing examples may be combined with any one or more of the other foregoing examples to create a new embodiment within the scope of the present disclosure.

DETAILED DESCRIPTION

Figure 1:
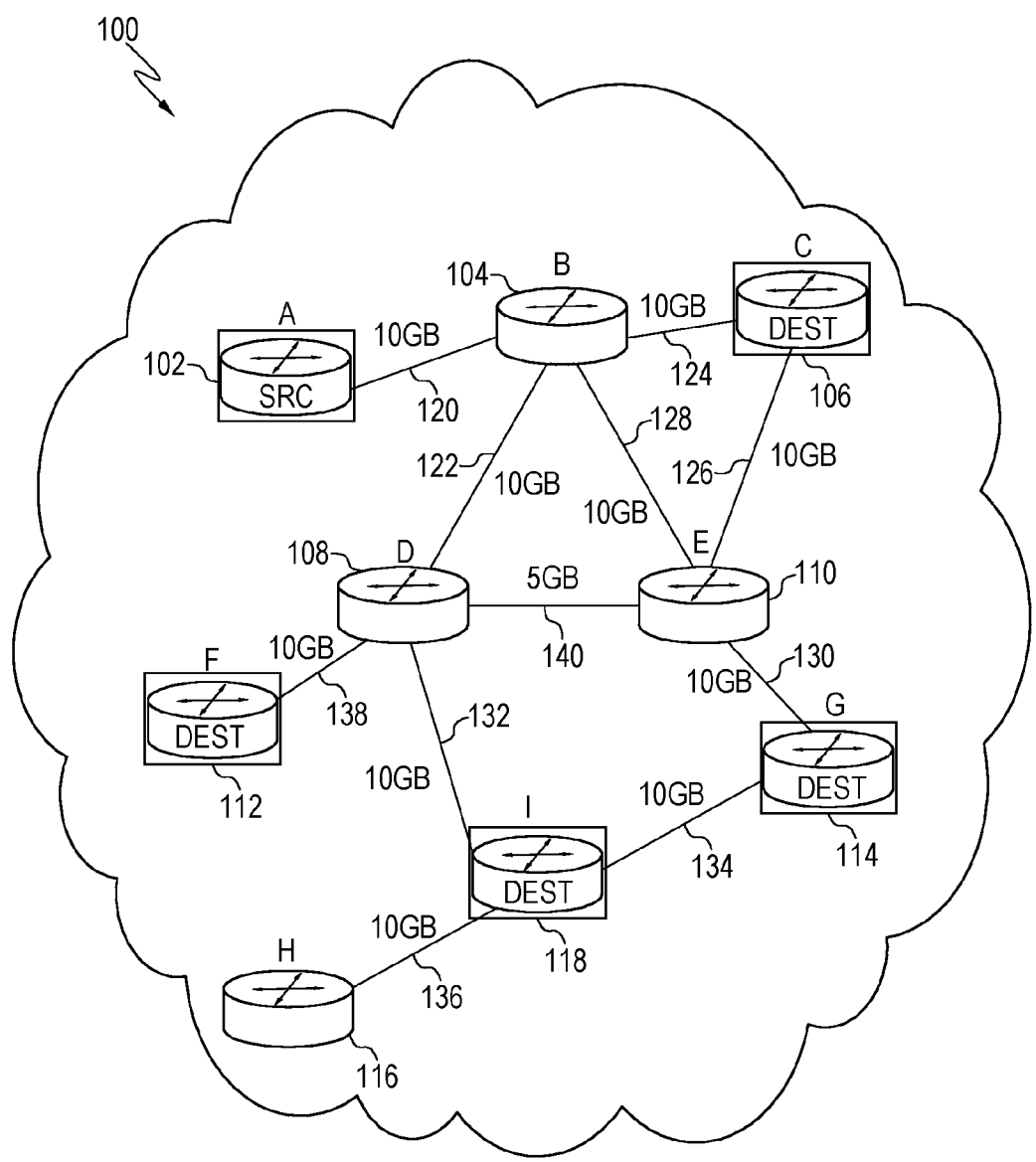
FIG. 1 is a diagram of a network domain topology for a constrained shortest path determination from one source to each of multiple destinations, according to an example embodiment.

In the following description, reference is made to the accompanying drawings that form a part hereof, and in which is shown by way of illustration specific embodiments which may be practiced. These embodiments are described in sufficient detail to enable those skilled in the art to practice the invention, and it is to be understood that other embodiments may be utilized and that structural, logical, and electrical changes may be made without departing from the scope of the present invention. The following description of example embodiments is, therefore, not to be taken in a limited sense, and the scope of the present invention is defined by the appended claims.

The functions or algorithms described herein may be implemented in software in one embodiment. The software may consist of computer-executable instructions stored on computer-readable media or computer-readable storage device such as one or more non-transitory memories or other type of hardware based storage devices, either local or networked. Further, such functions correspond to modules, which may be software, hardware, firmware or any combination thereof. Multiple functions may be performed in one or more modules as desired, and the embodiments described are merely examples. The software may be executed on a digital signal processor, ASIC, microprocessor, or other type of processor operating on a computer system, such as a personal computer, server or other computer system, turning such computer system into a specifically programmed machine.

Increasing use of computer services means the service companies have to provide ever larger computer networks to handle the increasing loads. The computer networks may include a plurality of servers coupled together over a network. The network may be either wired (e.g., Ethernet, cable, fiber optics) or wireless (e.g., radio). Each server may be referred to as a node within the network.

In performing a computer service within the network, it may be necessary for one computer to access another computer to communicate data. The communication of data between computers requires the source computer (e.g., source node) to find a path to the destination computer (e.g., destination node) through the various paths that connect the two nodes. However, as these networks grow, finding the shortest path becomes increasingly time consuming and, thus, expensive in terms of computer time. For example, finding the cheapest delay-constrained path is critical for real-time data flows such as voice/video calls. Thus, the problem is to find the cheapest path that satisfies certain constraints.

The constrained shortest path may be defined as a shortest path (e.g., measured in time or distance) between the source and destination nodes that meets a given set of constraints. Those paths that violate the given set of constraints are removed, thus leaving only those paths that meet the constraints. A constraint may be defined as a minimum bandwidth required per link (also known as bandwidth guaranteed constraint), an end-to-end delay, a maximum number of links traversed, or a number of included/excluded nodes.

It may also be necessary to determine constrained paths from one source to multiple destinations. Conventionally, this is accomplished by determining a path from one source to each of multiple destinations, one path at a time. This can be time consuming and, thus, costly in terms of computer time. The disclosed embodiments for determining the constrained shortest paths determine shortest paths from one source to multiple destinations at one time. Similarly, the disclosed embodiments also determine the shortest paths from multiple sources to one destination in a substantially similar manner.

FIG. 1 is a diagram of a network domain topology 100 for a constrained shortest path determination from one source to each of multiple destinations, according to an example embodiment. The network domain topology 100 is for purposes of illustrating the following examples of operation of the method for determining a constrained shortest path and does not limit the embodiments to any one topology. The network domain topology 100 includes nodes 102, 104, 106, 108, 110, 112, 114, 116, and 118, and links 120, 122, 124, 126, 128, 130, 132, 134, 136, 138, and 140. The nodes 102-118 are also labeled with letters A-I and may be referred to by letter instead of number. The nodes A-I may be computers, computer servers, or other types of network nodes. In some example embodiments, the nodes A-I are implemented using a computer system 200, described with respect to FIG. 2.

Each node A-I is coupled to an adjacent node through at least one of the links 120-140. Each of the links 120-140 has a maximum available bandwidth. In the illustrated embodiment, the maximum available bandwidth of each link 120-140 is 10 Gigabytes (GB). This maximum available bandwidth is for purposes of illustration only and does not limit the embodiments to any one bandwidth. The maximum available bandwidth of a link refers to the bandwidth available to a single application if no other application were using the link. The remaining available bandwidth of a link refers to the bandwidth remaining for allocation to applications after existing bandwidth allocations are taken into account. Thus, the remaining available bandwidth for each link is initialized to the maximum available bandwidth for the link. The remaining available bandwidth for each link may change, as described subsequently, as the method progresses.

In subsequent discussions, for purposes of clarity of operation, each of the links 120-140 will be referred to by the two end nodes A-I that define that particular link. For example, the link 120 is link A to B, the link 122 is link B to D, the link 124 is link B to C, the link 126 is link C to E, the link 128 is link B to E, the link 130 is link E to G, the link 132 is link D to I, the link 134 is link G to I, the link 136 is link I to H, the link 138 is link D to F, and the link 140 is link D to E.

Also in subsequent examples, the cost of each link 120-140 is 1. As known in the art, a "cost" may be defined as a metric to define a relative net worth of a link. Thus, the cost of Link A to B is 1. The cost of the path from A to G, using Link A to B (cost 1), Link B to E (cost 1), and Link E to G (cost 1), is 3 since there are three links (i.e., 1+1+1) between A and G.

Links are directional. The cost of a link in one direction may be different from the cost of the link in a reverse direction. For example, the link 120 from node A to node B has a cost of 1, but the link 120 from node B to node A may have a cost of 3. Links may have different costs based on ownership of the nodes or links involved. For example, each link within a private network may have a cost of 1 and links in other networks may have a higher cost (e.g., 2, 3, or 5). The bandwidth of a link in one direction may be different from the bandwidth of the link in a reverse direction. For example, the link 120 from node A to node B has a bandwidth of 10 GB, but the same link in the opposite direction (from node B to node A) may have a bandwidth of 20 GB. In the following descriptions, it is assumed that a link has a same cost and bandwidth in two directions if it is not specified that they are different.

Reference is made to candidate nodes. A candidate node is a node that has the possibility of being used in a shortest path tree (SPT). The SPT is a diagram of node hops (e.g., a connection of two nodes via a single link) that are currently the shortest path that meet the desired constraints.

Candidate nodes may be stored in candidate data structures of the form {WN, MinCost, MaxBW, PH}. "WN" represents the working node (e.g., the candidate node). "MinCost" represents the minimum cost for the path from the root of the SPT to the working node that satisfies a set of constraints for the path. The root of the SPT is the source node. "MaxBW" represents the maximum bandwidth of the path from the root of the SPT to the working node. "PH" represents the previous hop node. As used herein, candidate refers to a candidate data structure and candidate node refers to the working node of a candidate.

Thus, referring to FIG. 1 as an example, Node B as a candidate node on a shortest path from source node A would be represented by {B, 1, 10 GB, A} where B is the working node, 1 is the minimum cost of the path from node A to node B, 10 GB is the maximum bandwidth of the path from node A to node B, and node A is the previous hop node of node B along the path from A to B. In FIG. 1, each of the links 120-138 has a bandwidth of 10 GB but the link 140 has a bandwidth of 5 GB. Thus, any node that traces a path back to node A without traversing the link 140 will have a maximum bandwidth from node A to the working node of 10 GB and any node that traces a path back to node A by traversing the link 140 will have a maximum bandwidth from node A to the working node of 5 GB. In other words, the maximum bandwidth of the entire path is the lowest maximum bandwidth of any link on the path.

Figure 2:
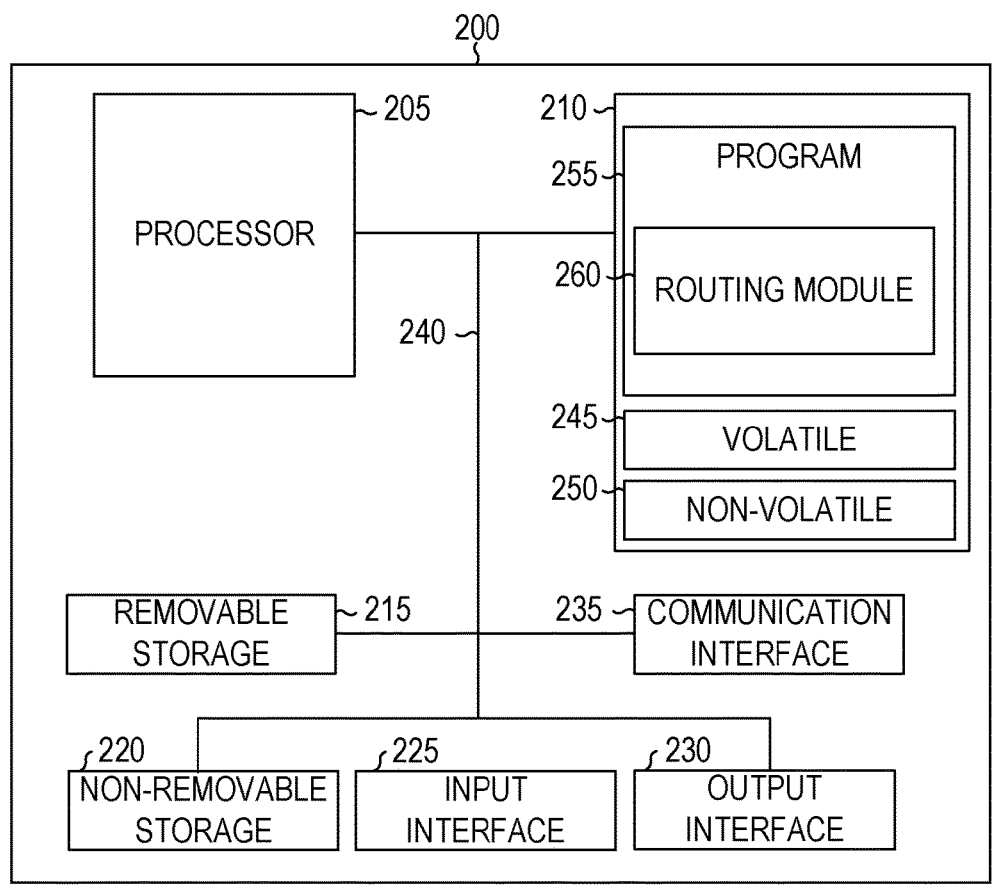
FIG. 2 is a block diagram illustrating a system for clients, servers, nodes, and cloud-based resources for implementing algorithms and performing methods according to example embodiments.

FIG. 2 is a block diagram illustrating circuitry for implementing algorithms and performing methods, according to example embodiments. All components need not be used in various embodiments. For example, clients, servers, routers, SDN controllers, and cloud-based network resources may each use a different set of components, or, in the case of servers for example, larger storage devices.

One example computing device in the form of a computer 200 (also referred to as computing device 200 and computer system 200) may include a processor 205, memory storage 210, removable storage 215, and non-removable storage 220, all connected by a bus 240. Although the example computing device is illustrated and described as the computer 200, the computing device may be in different forms in different embodiments. For example, the computing device may instead be a smartphone, a tablet, a smartwatch, a router, a switch, or another computing device including elements the same as or similar to those illustrated and described with regard to FIG. 2. Devices such as smartphones, tablets, and smartwatches are generally collectively referred to as "mobile devices" or "user equipment." Further, although the various data storage elements are illustrated as part of the computer 200, the storage may also or alternatively include cloud-based storage accessible via a network, such as the Internet, or server-based storage.

The memory storage 210 may include volatile memory 245 and non-volatile memory 250, and may store a program 255. The computer 200 may include—or have access to a computing environment that includes—a variety of computer-readable media, such as the volatile memory 245, the non-volatile memory 250, the removable storage 215, and the non-removable storage 220. Computer storage includes random-access memory (RAM), read-only memory (ROM), erasable programmable read-only memory (EPROM) and electrically erasable programmable read-only memory (EEPROM), flash memory or other memory technologies, compact disc read-only memory (CD ROM), digital versatile disks (DVD) or other optical disk storage, magnetic cassettes, magnetic tape, magnetic disk storage or other magnetic storage devices, or any other medium capable of storing computer-readable instructions.

The computer 200 may include or have access to a computing environment that includes an input interface 225, an output interface 230, and a communication interface 235. The output interface 230 may interface to or include a display device, such as a touchscreen, that also may serve as an input device. The input interface 225 may interface to or include one or more of a touchscreen, a touchpad, a mouse, a keyboard, a camera, one or more device-specific buttons, one or more sensors integrated within or coupled via wired or wireless data connections to the computer 200, and other input devices. The computer 200 may operate in a networked environment using the communication interface 235 to connect to one or more remote computers, such as database servers. The remote computer may include a personal computer (PC), server, router, network PC, peer device or other common network node, or the like. The communication interface 235 may connect to a local-area network (LAN), a wide-area network (WAN), a cellular network, a WiFi network, a Bluetooth network, or other networks.

Computer-readable instructions stored on a computer-readable medium (e.g., the program 255 stored in the memory storage 210) are executable by the processor 205 of the computer 200. A hard drive, CD-ROM, and RAM are some examples of articles including a non-transitory computer-readable medium such as a storage device. The terms "computer-readable medium" and "storage device" do not include carrier waves to the extent that carrier waves are deemed too transitory. "Computer-readable non-transitory media" includes all types of computer-readable media, including magnetic storage media, optical storage media, flash media, and solid-state storage media. It should be understood that software can be installed in and sold with a computer. Alternatively, the software can be obtained and loaded into the computer, including obtaining the software through a physical medium or distribution system, including, for example, from a server owned by the software creator or from a server not owned but used by the software creator. The software can be stored on a server for distribution over the Internet, for example.

The program 255 is shown as including a routing module 260. Any one or more of the modules described herein may be implemented using hardware (e.g., a processor of a machine, an ASIC, an FPGA, or any suitable combination thereof). Moreover, any two or more of these modules may be combined into a single module, and the functions described herein for a single module may be subdivided among multiple modules. Furthermore, according to various example embodiments, modules described herein as being implemented within a single machine, database, or device may be distributed across multiple machines, databases, or devices.

The routing module 260 may be implemented on a router or SDN controller to determine routes between nodes in a network. For example, the routing module 260 may receive requests to determine paths from a source node to multiple destination nodes, from multiple source nodes to a single destination node, or any suitable combination thereof. The routing module 260 may determine paths that satisfy path constraints using any of the methods described herein.

Figure 3:
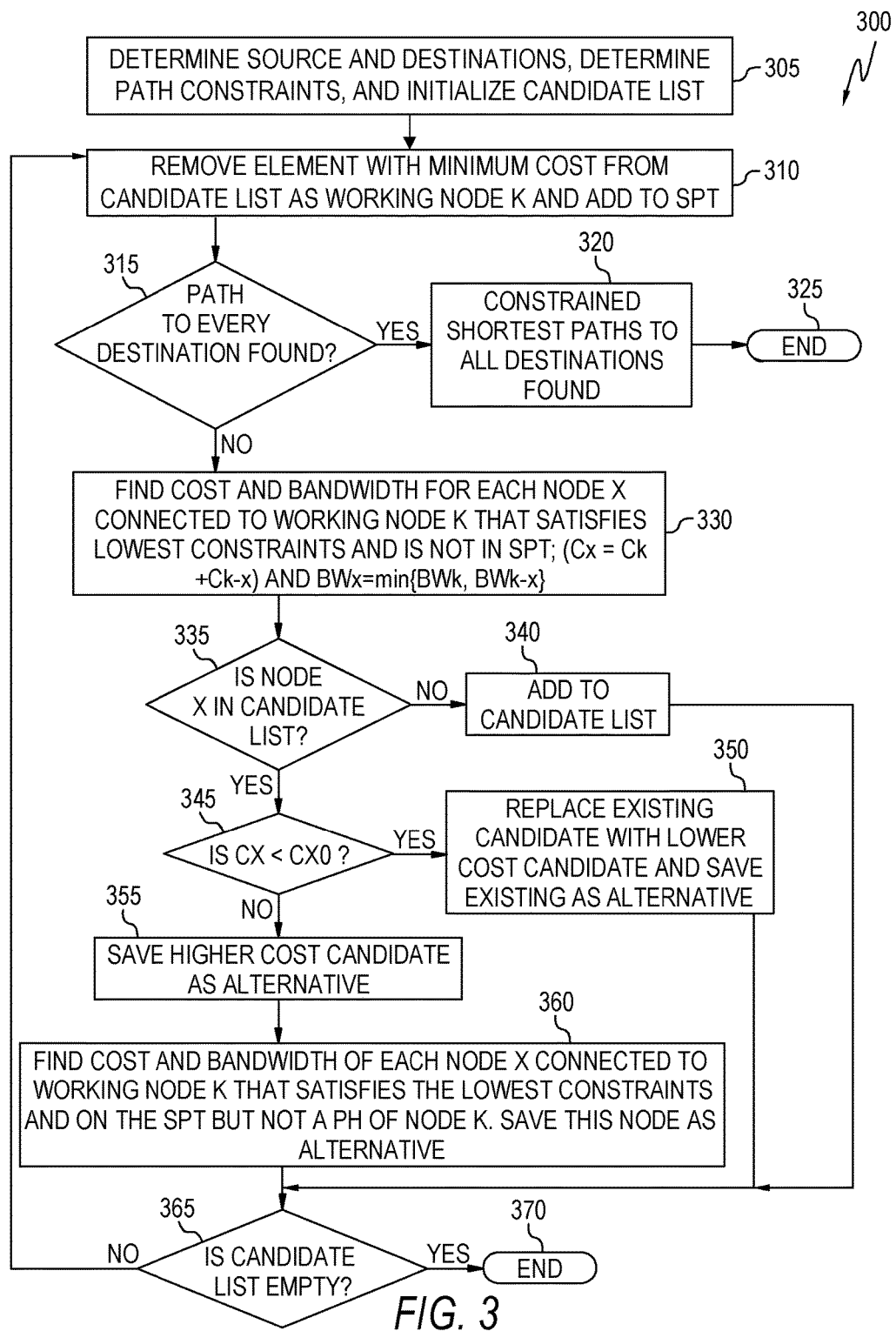
FIG. 3 is a flow chart of a method for determining a constrained shortest path in a network from one source to each of multiple destinations, according to an example embodiment.

FIG. 3 is a flow chart of a method 300 for determining a constrained shortest path in a network from one source to each of multiple destinations, according to an example embodiment. The method 300 includes operations 305, 310, 315, 320, 325, 330, 335, 340, 345, 350, 355, 360, 365, and 370. By way of example and not limitation, the method 300 is described as being performed by the computer system 200 of FIG. 2 operating in the network domain topology 100 of FIG. 1.

In operation 305, the routing module 260 determines the path constraints, the source node and the destination nodes, and initializes the candidate list. An initial candidate would be represented by {Src, 0, MaxBW, _} where Src is the source node, MinCost=0, MaxBW=a maximum number in a computer (e.g., 2,147,483,647 when signed 32-bit values are used), and PH=none since it is the first node in the path (i.e., the source node) and there are no nodes prior to the source node. The candidate list comprises the initial candidate. Each of the destination nodes is marked or flagged as a destination (e.g., by adding a destination mark to a data structure corresponding to the destination node). A lowest constraint is selected among the constraints for the paths from the source node to the destination nodes that are marked as destinations. For example, if paths from node A are requested to the destination nodes C, F, G, and I, the four requested paths may have different minimum bandwidth constraints. The lowest minimum bandwidth from among the four is selected in operation 305. For illustration purposes, the type of constraint discussed is a bandwidth constraint, but other constraint types may be used (e.g., a maximum cost constraint, a maximum number of hops constraint, or a combination of constraints).

In operation 310, the routing module 260 selects a candidate (e.g., a candidate having node k as the working node) with a minimum cost and removes the candidate from the candidate list. The working node of the candidate with its associated information is added to the shortest path tree (SPT), which is initially empty. In one embodiment, a SPT may be represented in a form of a graph (e.g., in FIGS. 4 to 14 below). In another embodiment, the SPT may be represented in a list of the candidates selected.

If node k is marked as a destination node and the constraint for the path from the source to node k is satisfied, then the shortest path from the source to node k satisfying the constraint has been found. The constraint bandwidth (e.g., 1 GB) for the path is reserved for each of the links along the path. The remaining available bandwidth of each of the links along the path is then the available bandwidth (e.g., 10 GB) of the link minus the constraint bandwidth (e.g., 1 GB) for the path from the source node Src to node k. The destination mark or flag for the node (e.g., node k) is removed. The lowest constraint among the constraints for the rest of the paths is determined. Continuing with the example in which paths are requested from node A to nodes C, F, G, and I, if node k were node C, the remaining destinations would be nodes F, G, and I. The lowest minimum bandwidth from among the remaining three paths would be selected in operation 310. A bandwidth constraint for a path indicates a bandwidth (e.g., 1 GB) requirement for the path. The bandwidth indicated by a bandwidth constraint is also called the constraint bandwidth. When there is a bandwidth constraint for a path from the source node to each of the destination nodes marked as destinations, the lowest constraint is the bandwidth constraint indicating minimum bandwidth among the constraints for the paths from the source node to the destination nodes marked as destinations.

In operation 315, the routing module 260 determines if the path from the source to every destination has been found. If so, in operation 320, the constrained shortest paths to all of the destination nodes have been found and saved and, in operation 325, the method 300 ends.

If not all of the paths from the source to every destination have been found, then, in operation 330, the routing module 260 finds a cost and bandwidth for each node x (e.g., a subsequent node connected by a link to the working node, the subsequent node being different from the prior node of the candidate selected in operation 310) connected to working node k that satisfies the lowest constraint and also is not already in the shortest path tree. For example, assume that Ck and BWk are the respective minimum cost and maximum bandwidth of the path from the source to working node k. For each node x that is connected over a link from node k to node x, that satisfies the selected constraint, and is not in the shortest path tree, the cost Cx and bandwidth BWx for node x is determined as follows:

Cx=Ck+Ck-x, where Ck-x is the cost of the link from node k to node x; and

BWx=min(BWk, BWk-x), where BWk-x is the available bandwidth of the link from node k to node x.

Cx and BWx are the respective minimum cost and maximum bandwidth of the path from the source to node x via previous hop node k.

In operation 335, if the candidate list does not include any candidates with node x as the working node, then, in operation 340, the routing module 260 adds the candidate {x, Cx, BWx, k} into the candidate list and the method proceeds with operation 365. Otherwise, a candidate of the form {x, Cx0, BWx0, PHx} is already in the candidate list.

In operation 345, the routing module 260 determines if the cost Cx of the newer candidate node {x, Cx, BWx, k} is less than the cost of the existing candidate node {x, Cx0, BWx0, PHx}. In other words, the routing module 260 determines if Cx is less than Cx0.

If Cx is less than Cx0, then in operation 350 the routing module 260 replaces the existing candidate {x, Cx0, BWx0, PHx} with the new, lower cost candidate {x, Cx, BWx, k}. The existing candidate from the candidate list (i.e., {x, Cx0, BWx0, PHx}) may be saved for use as an alternative path. The method 300 continues with the operation 365.

If Cx is determined to be not less than Cx0 in operation 345, the higher cost candidate {x, Cx, BWx, k} may be saved for use as an alternate path, in operation 355.

In operation 360, the routing module 260, for each node x connected to working node k that satisfies the lowest constraint and also is already in the shortest path tree but not a previous hop node of node k, assumes that Ck and BWk are the respective cost and bandwidth of working node k. In other words, Ck and BWk are the respective minimum cost and maximum bandwidth of the path from the source to node k. For each node x that is connected over a link from node k to node x, satisfying the lowest constraint, and is in the shortest path tree but not a previous hop node of node k, the cost Cx and bandwidth BWx for node x is determined as follows:

Cx=Ck+Ck-x, where Ck-x is the cost of the link from node k to node x; and

BWx=min(BWk, BWk-x), where BWk-x is the available bandwidth of the link from node k to node x. This node x is saved for use as an alternative path.

In operation 365, the routing module 260 determines if the candidate list is empty. If the candidate list is empty, the method 300 ends in operation 370. If the candidate list is not empty, the method 300 repeats from operation 310 until either the candidate list is empty or all of the constrained shortest paths to all of the destinations have been found.

FIGS. 4-14 are shortest path tree diagrams to illustrate an example of operation of the method 300 of FIG. 3. The example, based on the network diagram of FIG. 1 and the method 300, uses a source node 102 (node A) and multiple destination nodes 104, 106, 110, and 112 (nodes C, F, G, and I). In this example, each of the links 120-138 has an initially available bandwidth of 10 GB and the link 140 has an initially available bandwidth of 5 GB. The constraint for the following example is 1 GB bandwidth for each source-to-destination path.

Initially (e.g., in operation 305), the candidate list includes one element {A, 0, MaxBW, _} including the four items discussed previously. Since the source node and node A are the same node: source node=node A, cost from source node to node A=0, maximum bandwidth of the path from the source node to node A=MaxBW (a maximum number such as 65,535 GB), and node A's previous hop node along the path from source node to Node A=null. Each of the destination Nodes C, G, I, and F may be marked with a flag bit or some other representation to indicate their destination status. The lowest path constraint is 1 GB bandwidth.

The first element {A, 0, MaxBW, _} is removed from the candidate list and added to the shortest path tree (SPT) (e.g., in operation 310). The shortest path tree (not shown) is now only that one element. For each node x connected to node A by a link that satisfies the lowest path constraint, consider element {x, Cx, BWx, A} to be added into the candidate list (e.g., in operation 330). As before, Cx is the cost of the path from the source to node x, BWx is the maximum available bandwidth of the path from the source to node x, and node A is the previous hop node of node x along the path from the source to node x. Since node B is the only node directly (i.e., without intermediary nodes) connected to node A, the updated candidate list is now: {{B, 1, 10 GB, A}} (e.g., in operation 340).

Figure 4:
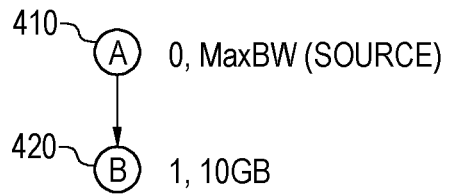
FIGS. 4-14 are updated shortest path tree (SPT) diagrams in accordance with the embodiments of FIGS. 1 and 3.

Returning to operation 310, the element {B, 1, 10 GB, A} is removed from the candidate list and added to the SPT. FIG. 4 illustrates the updated SPT diagram in accordance with the embodiments of FIGS. 1 and 3. The SPT of FIG. 4 is a data structure showing the relationship between element 410, representing the source node 102 (node A) with its associated cost (i.e., 0) and associated bandwidth (i.e., MaxBW) and the previous hop node that does not exist.

FIG. 4 also shows the next element 420, representing node 104 (node B) with its associated path cost of 1 from node A to node B and the associated bandwidth of 10 GB.

For each node x connected to node B that is not an ancestor node of node B in the SPT (e.g., is not node A) and satisfies the lowest path constraint, consider the element {x, Cx, MBx, B} to be added into the candidate list (e.g., in operation 330). The updated candidate list is now: {{C, 2, 10 GB, B}, {E, 2, 10 GB, B}, {D, 2, 10 GB, B}}.

Figure 5:
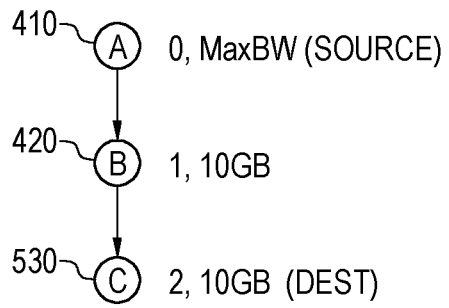

The first element {C, 2, 10 GB, B} is removed from the candidate list (in operation 310) and added to the SPT to generate a new SPT. FIG. 5 is the updated SPT diagram in accordance with the embodiments of FIGS. 1 and 3. FIG. 5 includes elements 410, 420, and 530. The element 530 represents the node 106 (node C).

Figure 6:
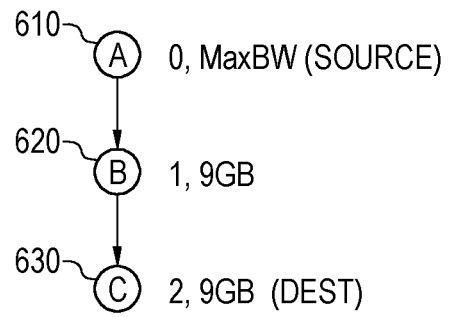

Since node C is marked as a destination node, the path from node A to node C has been found and satisfies the constraint of a 1 GB bandwidth over each link of the entire path. Since the source will use 1 GB of the available 10 GB bandwidth of each link of the path from node A to node C, the available bandwidths of each of the links that make up the path from node A to node C are now updated by subtracting the constraint bandwidth of 1 GB from the available bandwidth of 10 GB for each link (e.g., 10 GB−1 GB=9 GB of available bandwidth remaining). The destination mark/flag for the destination node C is removed and the SPT and candidate list are updated. FIG. 6 is the updated SPT diagram in accordance with the embodiments of FIGS. 1 and 3, including elements 610, 620, and 630. FIG. 6 shows the updated SPT diagram in accordance with the changes of available bandwidth between node A and node C of 9 GB per link.

The candidate list is now: {{E, 2, 9 GB, B}, {D, 2, 9 GB, B}}.

For each node x connected to node C that is not an ancestor node of node C in the SPT (e.g., is not node A or node B), consider the element {x, Cx, MBx, C} to be added into the candidate list. The updated candidate list is now: {{E, 2, 9 GB, B}({E, 3, 9 GB, C}), {D, 2, 9 GB, B}}.

Note that the longer alternative path to node E via node C is recorded under {E, 2, 9 GB, B} and represented in the candidate list element {E, 3, 9 GB, C} following the element {E, 2, 9 GB, B}. The longer alternative path element {E, 3, 9 GB, C} is represented in parenthesis as ({E, 3, 9 GB, C}) to represent the fact that this element is saved as an alternative path but is not initially used as the shortest path. The listed elements {E, 2, 9 GB, B}({E, 3, 9 GB, C}) are considered to be one candidate list element since the alternate path is not used at this time.

Figure 7:
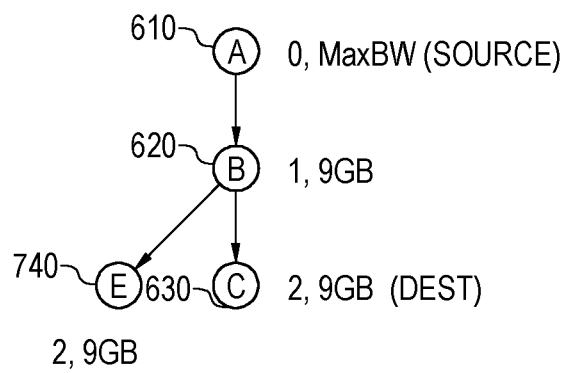

The first candidate list element is considered to be {E, 2, 9 GB, B}({E, 3, 9 GB, C}) and is removed from the candidate list and added to the SPT. FIG. 7 is the updated SPT diagram in accordance with the embodiments of FIGS. 1 and 3 and includes elements 610, 620, 630, and 740. The element 740 represents the node 110 (node E).

For each node x connected to node E that is not an ancestor node of node E in the SPT (e.g., is not node A or node B), consider element {x, Cx, BWx, E} to be added into the candidate list. For candidates with working nodes already present in the SPT, the candidate may be considered to be an alternative route. Thus, the path to node C via node E is considered to be an alternative route to the shorter path to node C already in the SPT. The updated candidate-list is now:

{{D, 2, 9 GB, B}({D, 3, 9 GB, E}), {G, 3, 9 GB, E}, ({C, 3, 9 GB, E}), ({E, 3, 9 GB, C}}.

Note that the longer alternative path to node D via node E is saved under element {D, 2, 9 GB, B} and represented as ({D, 3, 9 GB, E}) following {D, 2, 9 GB, B} in the candidate list. The alternative path to node E via node C is also saved.

Figure 8:
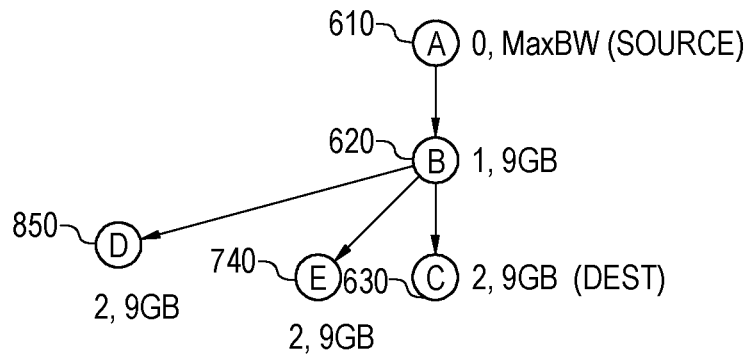

The first element {D, 2, 9 GB, B}({D, 3, 9 GB, E}) is removed from the candidate list and added to the SPT. FIG. 8 is the updated SPT diagram in accordance with the embodiments of FIGS. 1 and 3. FIG. 8 includes elements 610, 620, 630, 740, and 850. The element 850 represents the node 108 (node D). For each node x connected to node D and not having corresponding ancestor elements in the SPT, consider element {x, Cx, BWx, D} to be added into the candidate list. The updated candidate list is now:

{{G, 3, 9 GB, E}, {I, 3, 9 GB, D}, {F, 3, 9 GB, D}, ({D, 3, 9 GB, E}), ({C, 3, 9 GB, E}), ({E, 3, 5 GB, D}, {E, 3, 9 GB, C})}.

Note that for each node x on the SPT but not an ancestor of node D on the SPT that is connected to node D, the candidate {x, Cx, BWx, D} is considered as an alternative path to node x, indicated by parentheses. In this example, node B is an ancestor of node D on the SPT and nodes F and I are not on the SPT, so only the path from node D to node E is treated as alternative, as shown in the updated candidate list above.

Figure 9:
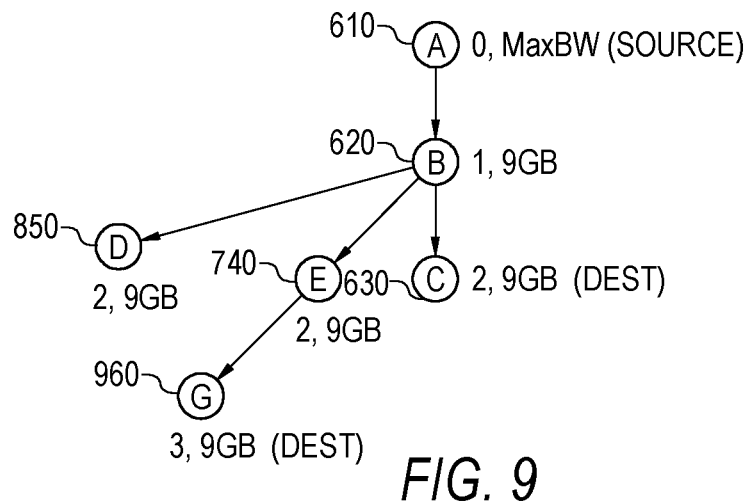

The first element {G, 3, 9 GB, E} is removed from the candidate list and the working node is added to the SPT. FIG. 9 is the updated SPT diagram in accordance with the embodiments of FIGS. 1 and 3. FIG. 9 includes elements 610, 620, 630, 740, 850, and 960. The element 960 represents the node 114 (node G).

Figure 10:
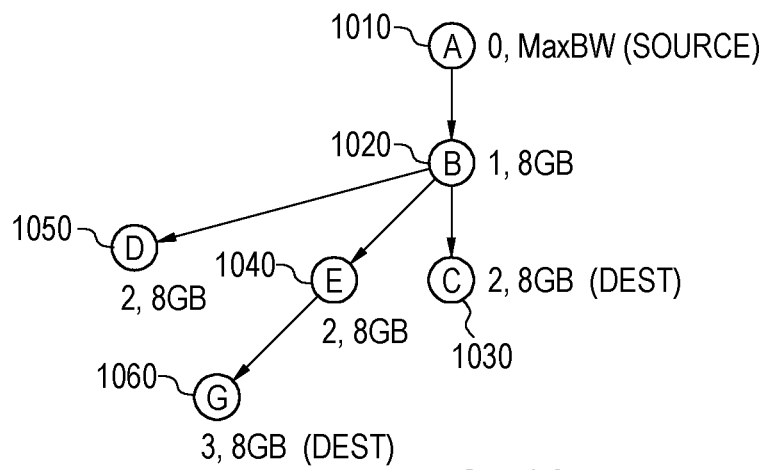

Since node G is marked as a destination and the path node A→node B→node E→node G satisfies the bandwidth constraint of 1 GB, the constraint bandwidth of 1 GB is subtracted from the available bandwidth of each of the links along the path node A→node B→node E→node G. The SPT and the candidate list are updated in accordance with the changes of the available bandwidth of each of the links along the path. The destination mark/flag for the destination node G is removed. FIG. 10 is the updated SPT diagram in accordance with the embodiments of FIGS. 1 and 3. FIG. 10 includes the elements 1010, 1020, 1030, 1040, 1050, and 1060. The updated candidate list is now:

{{I, 3, 8 GB, D}, {F, 3, 8 GB, D}, ({D, 3, 8 GB, E}), ({C, 3, 8 GB, E}), ({E, 3, 5 GB, D}, {E, 3, 8 GB, C})}.

For each node x connected to node G and not in the SPT, consider element {x, Cx, BWx, G} to be added into the candidate list. For each node x connected to node G in the SPT, and not an ancestor of node G in the SPT, consider element ({x, Cx, BWx, G} to be added into the candidate list. The updated candidate list is now:

{{I, 3, 8 GB, D}({I, 4, 8 GB, G}), {F, 3, 8 GB, D}, ({D, 3, 8 GB, E}), ({C, 3, 8 GB, E}), ({E, 3, 5 GB, D}, {E, 3, 8 GB, C})}.

Figure 11:
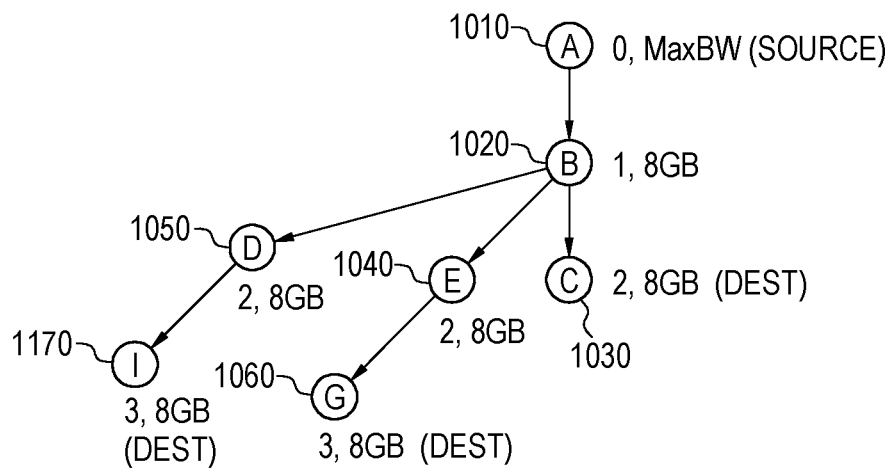

Note that the longer alternative path to node I via node G is saved under the candidate node {I, 3, 8 GB, D} and represented as ({I, 4, 8 GB, G}) following {I, 3, 8 G, D}. The first element {I, 3, 8 GB, D} is removed from the candidate list and added to the SPT. FIG. 11 is the updated SPT diagram in accordance with the embodiments of FIGS. 1 and 3. FIG. 11 includes elements 1010, 1020, 1030, 1040, 1050, 1060, and 1170. The element 1170 represents the node 118 (node I).

Figure 12:
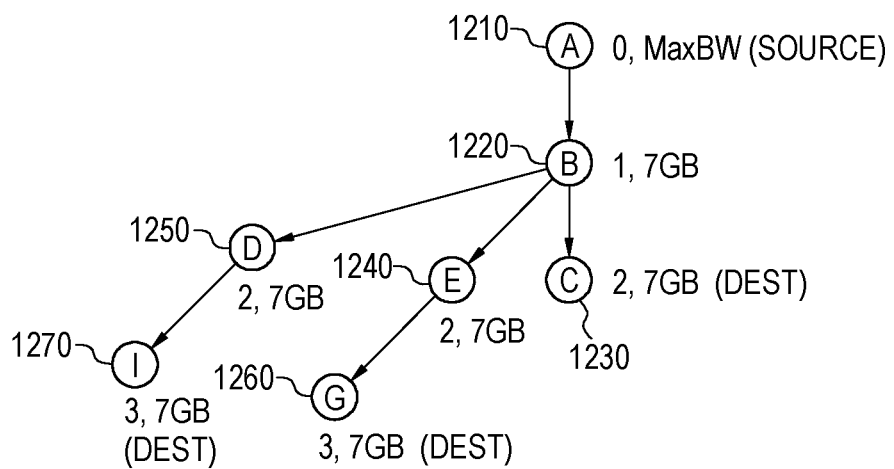

Node I is marked as a destination node, so the path from node A to node I is found (i.e., node A→node B→node D→node I) that satisfies the constraint bandwidth of 1 GB. The available bandwidths of the links along the path are then updated by subtracting the bandwidth constraint (e.g., 1 GB) from the previously available bandwidth (e.g., 8 GB) to generate the new available bandwidth (e.g., 7 GB). The destination mark/flag for destination node I is removed. FIG. 12 is the updated SPT diagram in accordance with the embodiments of FIGS. 1 and 3. FIG. 12 includes elements 1210, 1220, 1230, 1240, 1250, 1260, and 1270. The candidate list is now:

{{F, 3, 7 GB, D}, ({D, 3, 7 GB, E}), ({C, 3, 7 GB, E}), ({E, 3, 5 GB, D}, {E, 3, 7 GB, C}), ({I, 4, 7 GB, G})}.

For each node x connected to node I and not in the SPT, consider the element {x, Cx, BWx, I} to be added into the candidate list. For each node x connected to node I, in the SPT, and not an ancestor of node I in the SPT, consider element ({x, Cx, BWx, I} to be added into the candidate list. The updated candidate list is now:

{{F, 3, 7 GB, D}, {H, 4, 7 GB, I}, ({D, 3, 7 GB, E}), ({C, 3, 7 GB, E}), ({E, 3, 5 GB, D}, {E, 3, 7 GB, C}), ({I, 4, 7 GB, G}), (G, 4, 7 GB, I)}.

Figure 13:
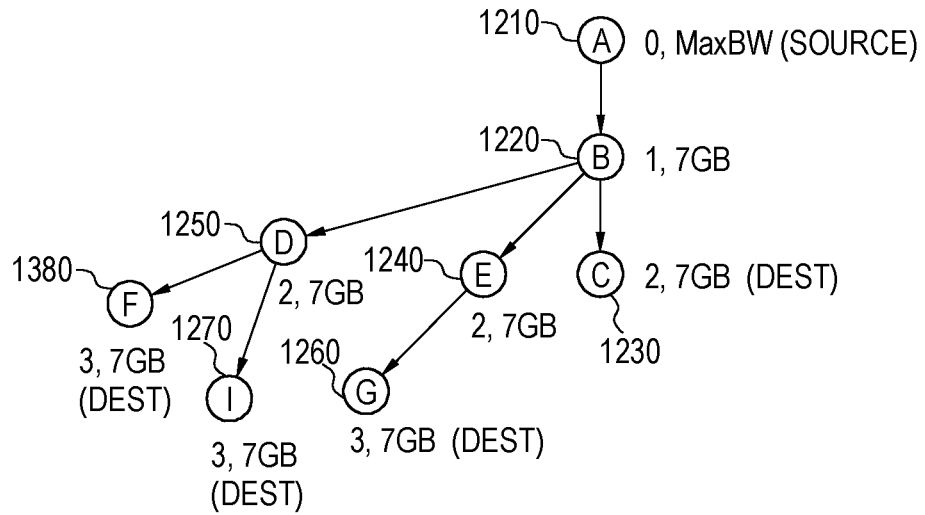

The first element {F, 3, 7 GB, D} is removed from the candidate list and added to the SPT. FIG. 13 is the updated SPT diagram in accordance with the embodiments of FIGS. 1 and 3. FIG. 13 includes elements 1210-1270 and 1380. The element 1380 represents the node 112 (node F). The updated candidate list is now:

{{H, 4, 7 GB, I}, ({D, 3, 7 GB, E}), ({C, 3, 7 GB, E}), ({E, 3, 5 GB, D}, {E, 3, 7 GB, C}), ({I, 4, 7 GB, G}), (G, 4, 7 GB, I)}.

Figure 14:
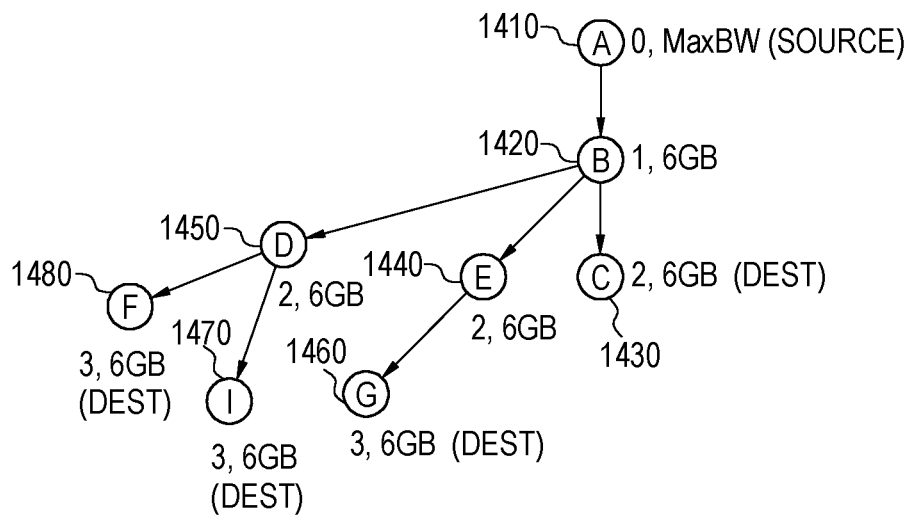

Node F is marked as a destination node, so the path from node A to node F is found (i.e., node A→node B→node D→node F) and satisfies the constraint of 1 GB of bandwidth. The previously available bandwidth of each of the links along the path is updated by subtracting the bandwidth constraint (e.g., 1 GB) from the previously available bandwidth (e.g., 7 GB) to generate the new available bandwidth (e.g., 6 GB). FIG. 14 is the updated SPT diagram in accordance with the embodiments of FIGS. 1 and 3. All paths have now been found, so the method 300 ends.

In the above example, when a shortest path from the source node to one of the destination nodes is found and satisfies the constraint (e.g., 1 GB bandwidth constraint for the path), the available bandwidth of each of the links along the path is updated by reducing the constraint bandwidth (e.g., 1 GB). After the reduction on the bandwidth of the links, the SPT and the candidate list are updated in accordance with the reduction.

In one embodiment, the SPT and the candidate list are not updated every time and the bandwidth of the links along a constrained shortest path from the source node to a destination node may not be reduced after the path is found. A minimum available link bandwidth (MALB) is recorded and maintained by the routing module 260. Initially MALB is set to a maximum number. When a link with an available bandwidth (LkBw) is used in a candidate path (i.e., a path represented by a candidate element), MALB=min(MALB, LkBw) (i.e., MALB is set to the smaller one between LkBw and MALB). When the available bandwidth of a link on a shortest constrained path is reduced to a new value NewLkBw, MALB=min(MALB, NewLkBw). When a destination node marked as a destination is added into the SPT, MALB may be used to determine whether the bandwidth constraint for the path from the source node to the destination node is satisfied. If MALB is greater than or equal to the constraint bandwidth (e.g., 1 GB), then the constraint is satisfied. If MALB is less than the constraint bandwidth, then the SPT and the candidate list may be updated in accordance with the latest available bandwidth of the links in the network.

The bandwidth BWy associated with the destination node y in the updated SPT may be used to determine whether the bandwidth constraint for the path from the source node to the destination node is satisfied. If BWy is greater than or equal to the constraint bandwidth (e.g., 1 GB), then the constraint is satisfied; otherwise the constraint is not satisfied. In order to not reduce the bandwidth of the links along a constrained shortest path from the source node to a destination node when the path is found, a maximum reserved or reduced link bandwidth (MRLB) is recorded. Initially the MRLB is set to zero. The routing module 260 maintains the MLRB. For example, when a shortest path satisfying its constraint is determined, the MRLB is set to the path constraint bandwidth plus the current MRLB. If the MRLB plus the lowest path constraint bandwidth is less than or equal to the MALB, then the routing module 260 may not reduce the bandwidth of the links along the path and may continue to compute the remaining paths; otherwise, the routing module 260 may reduce the bandwidth of the links along the paths found by the path constraint bandwidth associated with the path.

In another (simplified) embodiment, a longer alternative path is not considered or saved in the SPT or the candidate list. If MALB is less than the lowest constraint bandwidth after the reduction on the bandwidth of each of the links along a constrained shortest path from the source node to a destination node, then the remaining paths (i.e., the paths from the source node to the nodes still marked as destinations) are computed from an empty SPT and an initial candidate list (i.e., an candidate list containing only one element with the source node, cost of zero and bandwidth of a maximum number). Thus, the routing module 260 may set the SPT to empty and reset the candidate list to its initial state.

The above-described example described finding shortest constrained paths for one source node to multiple destination nodes. However, some embodiments may need to find the shortest constrained paths from multiple source nodes to one destination node. Such an embodiment is similar to the above-described embodiment with a number of changes.

When computing the path cost and bandwidth for node x (i.e., Cx and BWx, respectively) for candidate node {x, Cx, BWx, k} from a working node k, Cx=Ck+Ck-x, where Ck-x is the cost of the link from node x to node k. The bandwidth may be similarly computed by BWx=min(BWk, BWk-x), where BWk-x is the bandwidth of the link from node x to node k. Note that the cost and bandwidth for the link from node x to node k may be different than the cost and bandwidth for the link in a reverse direction (i.e., the link from node k to node x).

Figure 15:
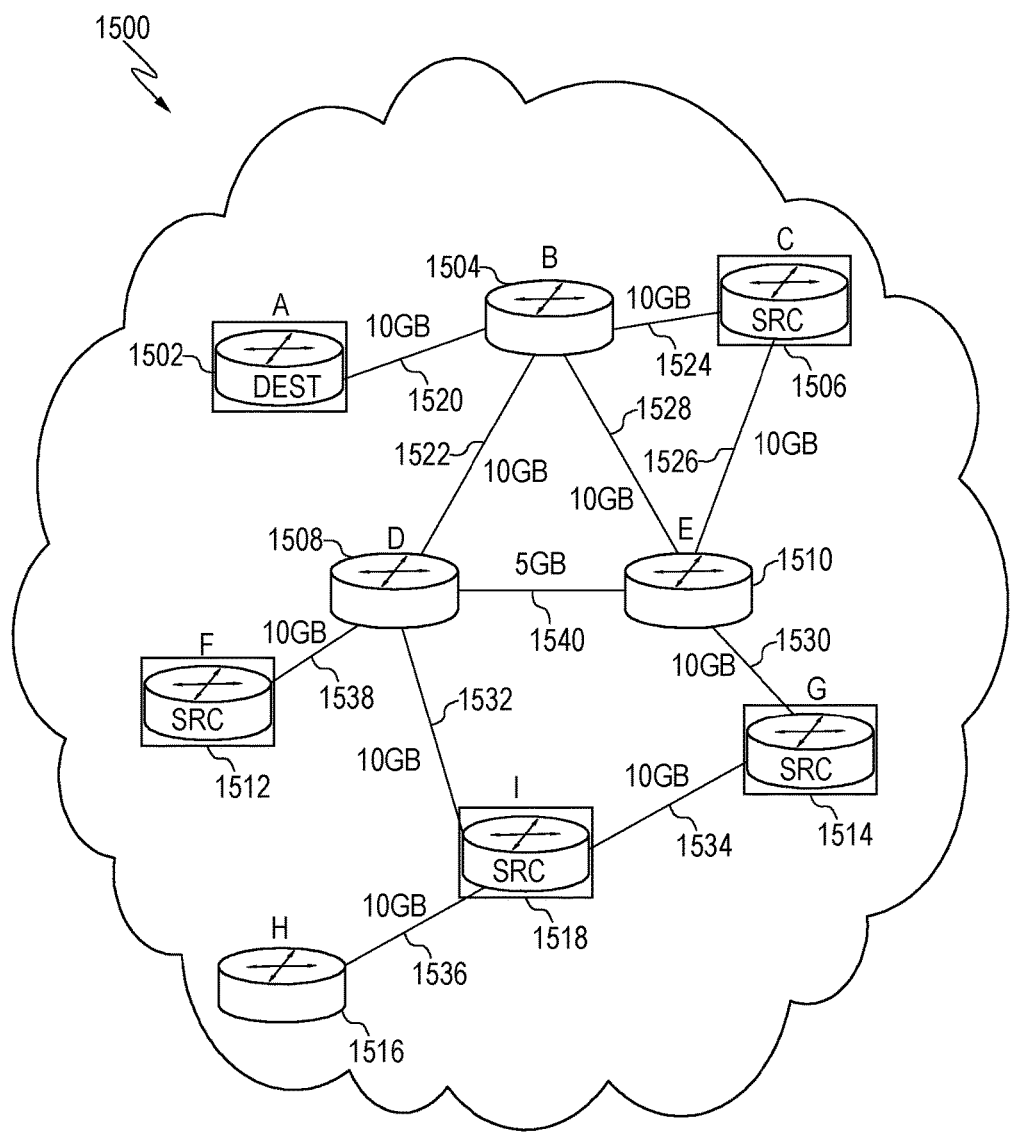
FIG. 15 is a diagram of a network domain topology for a constrained shortest path determination from each of multiple sources to one destination, according to an example embodiment.

FIG. 15 is a diagram of a network domain topology 1500 for a constrained shortest path determination from each of multiple sources to one destination, according to an example embodiment. This topology is for purposes of illustrating the following examples of operation of the method for determining a constrained shortest path and does not limit the embodiments to any one topology.

The network domain topology 1500 includes nodes 1502, 1504, 1506, 1508, 1510, 1512, 1514, 1516, and 1518 and links 1520, 1522, 1524, 1526, 1528, 1530, 1532, 1534, 1536, 1538, and 1540. The nodes 1502-1518 are also labeled with letters A-I and may be referred to by letter instead of number. The nodes A-I may be computers, computer servers, or other types of network nodes. In some example embodiments, the nodes A-I are implemented using a computer system 200, described with respect to FIG. 2.

Each node A-I is coupled to an adjacent node through at least one of the links 1520-1540. By comparison with the embodiment of FIG. 1, the node 1502 (node A) is now the destination node while the nodes 1506, 1512, 1514, and 1518 (nodes C, F, G, and I) are now the source nodes.

Figure 16:
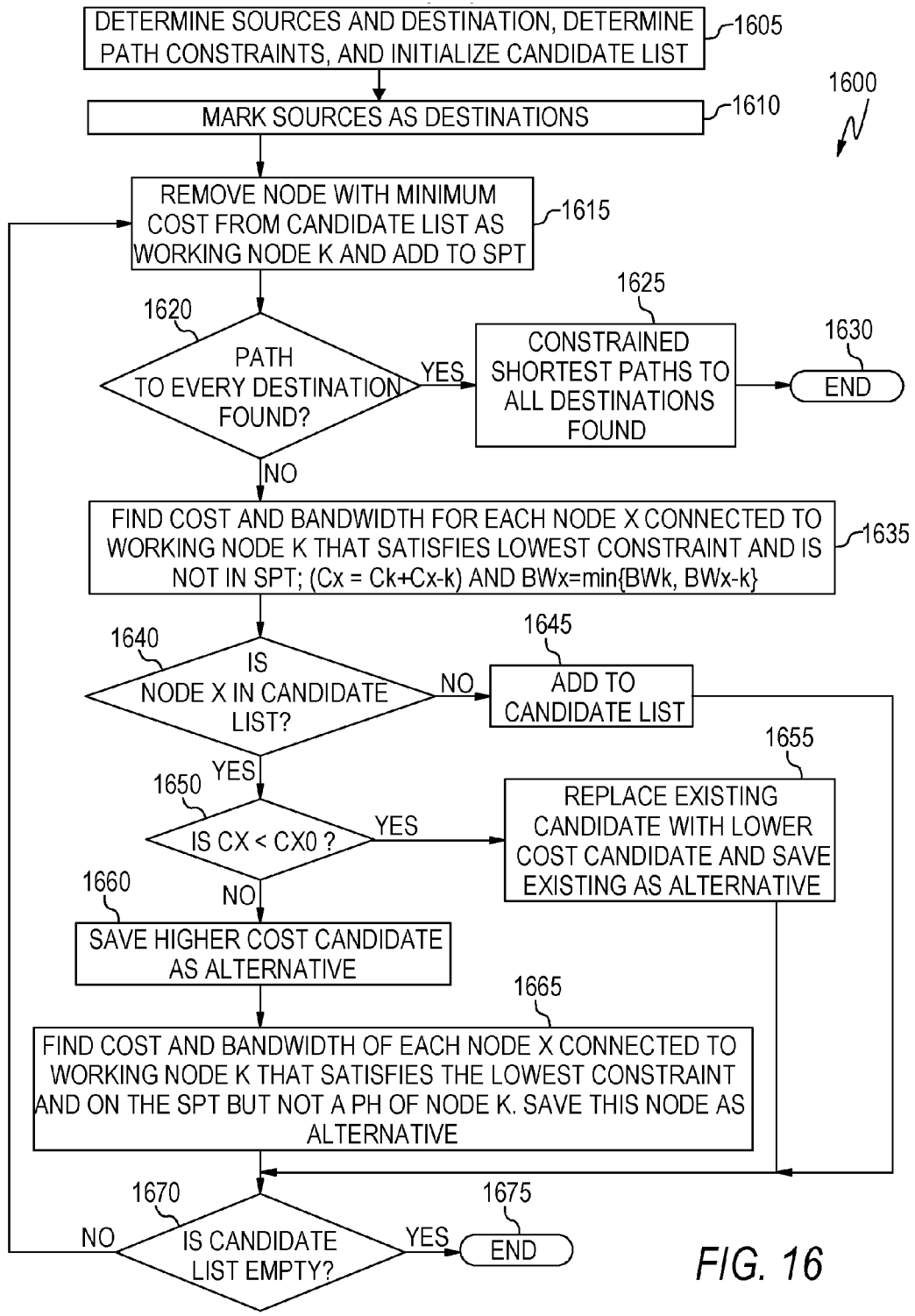
FIG. 16 is a flow chart of a method for determining a constrained shortest path in a network from each of multiple sources to one destination, according to an example embodiment.

FIG. 16 is a flow chart of a method 1600 for determining a constrained shortest path in a network from each of multiple sources to one destination, according to an example embodiment. The method 1600 includes operations 1605, 1610, 1615, 1620, 1625, 1630, 1635, 1640, 1645, 1650, 1655, 1660, 1665, 1670, and 1675.

In operation 1605, the routing module 260 determines the path constraints, the source nodes, and the destination node and initializes the candidate list. An initial candidate would be represented by {Src, 0, MaxBW, _} where Src is the destination node, MinCost=0, MaxBW=a maximum number, and PH=none since it is the first node (e.g., Node A) and there are no nodes prior to Node A. The lowest path constraint bandwidth is the lowest one among the path constraints for the path from each of the source nodes to the destination.

In operation 1610, the routing module 260 marks the source nodes as destination nodes. This is one of the differences between the method 300 of FIG. 3 having one source and multiple destinations and the method 1600 having multiple sources and one destination. Once the source nodes are marked as destinations, the previous method (method 300) may now be used with the exception of determining link cost and bandwidth as described subsequently.

In operation 1615, the routing module 260 selects a candidate that has a lowest cost and removes the selected candidate from the candidate list. For example, the candidate list may be sorted by minimum cost so that the candidate with the lowest cost among the minimum costs of candidates in the candidate list is the first candidate in the list. The working node of the candidate (e.g., node k) is used as the working node for operation 1615 and subsequent operations. The working node is added to the shortest path tree. If node k is marked as a destination node (e.g., a data structure corresponding to the node k includes a destination mark) and the constraint for the path from the source to node k is satisfied, then the path to node k has been found. The remaining bandwidth for each of the links along the path is then the available bandwidth (e.g., 10 GB) of the link minus the constraint bandwidth (e.g., 1 GB) for the path from the source node Src to node k. The destination mark for the working node (e.g., node k) is removed. The lowest constraint among the constraints for the rest of the paths is determined.

In operation 1620, the routing module 260 determines if the path from the source to every destination has been found. If so, in operation 1625, the constrained shortest paths to all of the destination nodes have been found and saved and, in operation 1630, the method 1600 ends.

If not all of the paths from the source to every destination have been found, then, in operation 1635, the routing module 260 finds a cost and bandwidth for each node x connected to working node k that satisfies the lowest constraint and also is not already in the shortest path tree. For example, assume that Ck and BWk are the respective cost and bandwidth of working node k. In other words, Ck and BWk are the respective minimum cost and maximum bandwidth of the path from the source to node k in a reverse direction. For each node x that is connected over a link from node x to node k, that satisfies the lowest constraint, and that is not in the shortest path tree, the cost Cx and bandwidth BWx for node x is determined as follows:
Cx=Ck+Cx-k, where Cx-k is the cost of the link from node x to node k; and BWx=min(BWk, BWx-k), where BWx-k is the bandwidth of the link from node x to node k.

Thus, determining the cost and bandwidth of each link is another difference between the method 300 of FIG. 3 having one source and multiple destinations versus the method 1600 having multiple sources and one destination. The method 300 determines the cost and bandwidth of each link in the direction of node k to node x. The method 1600 determines the cost and bandwidth of each link in the direction of node x to node k. These costs may or may not be different.

In operation 1640, if node x is not on the candidate list, then, in block 1645, the routing module 260 adds the new candidate {x, Cx, BWx, k} into the candidate list. Otherwise, {x, Cx0, BWx0, PHx} is already in the candidate list. Thus, in operation 1650, the routing module 260 determines if the cost Cx of the newer candidate node {x, Cx, BWx, k} is less than the cost of the existing candidate node {x, Cx0, BWx0, PHx}. In other words, the routing module 260 in operation 1650 determines if Cx<Cx0.

If Cx<Cx0, then in operation 1655 the routing module 260 replaces the existing candidate {x, Cx0, BWx0, PHx} with the new, lower cost candidate {x, Cx, BWx, k}. The existing candidate from the candidate list (i.e., {x, Cx0, BWx0, PHx}) may be saved for use as an alternative path. If Cx is determined to be not less than Cx0, the higher cost candidate {x, Cx, BWx, k} is saved for use as an alternate path, in operation 1660.

In operation 1665, for each node x connected to working node k that satisfies the lowest constraint and also is already in the shortest path tree but not previous hop node of node k, the routing module 260 finds the cost and bandwidth of each subsequent node x connected to the working node k. For example, assume that Ck and BWk are the respective cost and bandwidth of working node k. In other words, Ck and BWk are the respective minimum cost and maximum bandwidth of the path from the source to node k in a reverse direction. For each node x that is connected over a link from node x to node k, that satisfies the lowest constraint, and that is in the shortest path tree but not a previous hop node of node k, the cost Cx and bandwidth BWx for node x is determined as follows:
Cx=Ck+Cx-k, where Cx-k is the cost of the link from node x to node k; and BWx=min(BWk, BWx-k), where BWx-k is the bandwidth of the link from node x to node k.

This node x is saved for use as an alternative path. In operation 1670, the routing module 260 determines if the candidate list is empty. If the candidate list is empty, the method 1600 ends in operation 1675. If the candidate list is not empty, the method 1600 repeats from operation 1615 until either the candidate list is empty or all of the constrained shortest paths to all of the destinations have been found.

As described previously, in computation of a path from a source node to a destination node, the available bandwidth of every link along the path is reduced by the amount to be used for that path when the path satisfies the constraint for the path. If the originally available link bandwidth is not high enough to handle all of the various source to destination paths through a particular link, it is possible that one or more links may have an updated bandwidth of zero or less than lowest bandwidth constraint. If the available bandwidth of a link becomes zero or less than lowest bandwidth after the reduction for a constrained shortest path, then the following link bandwidth zero handling method may be used.

Figure 17:
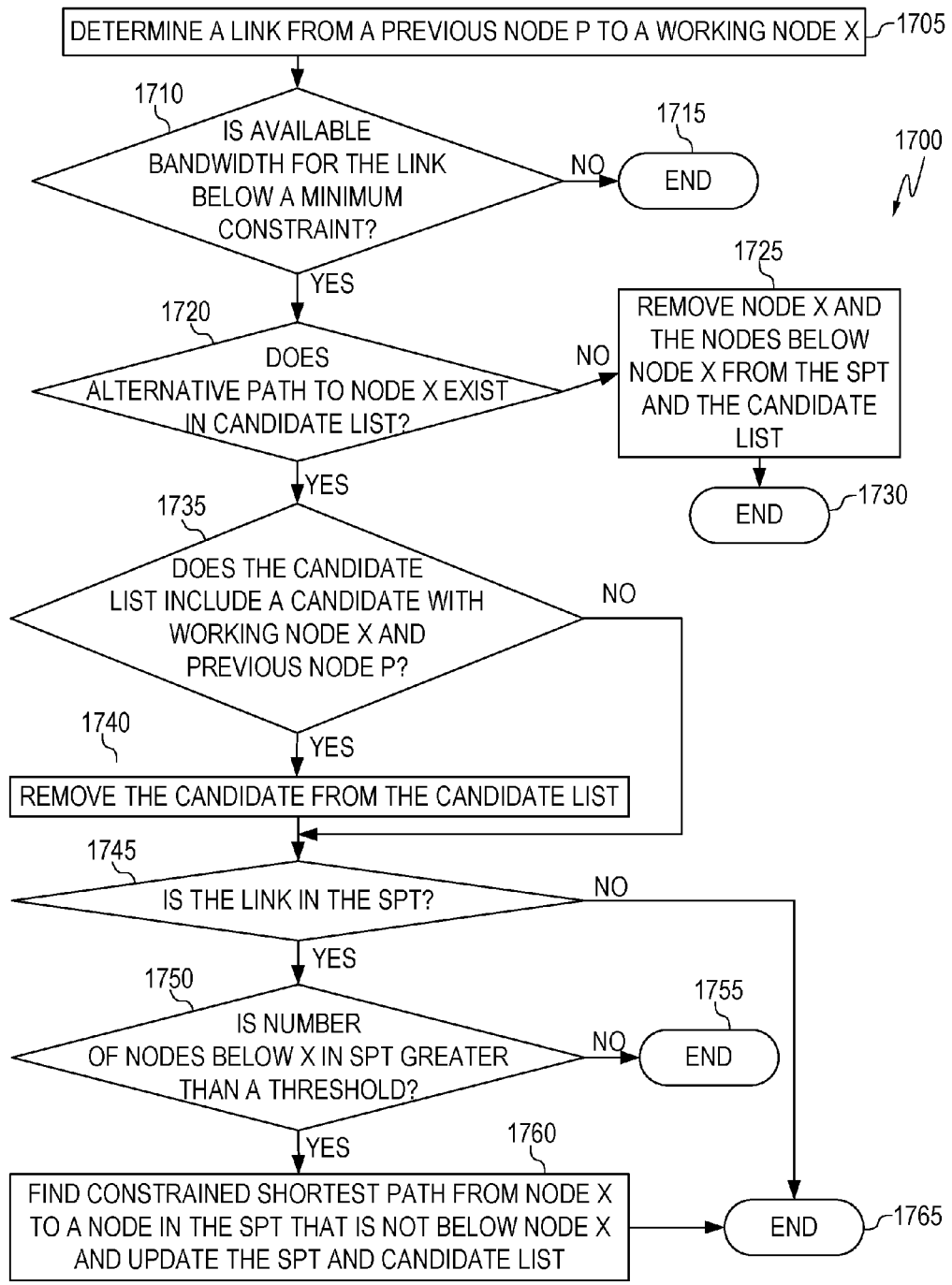
FIG. 17 illustrates a flowchart of a method for handling links having remaining bandwidth less than the lowest bandwidth constraint of remaining paths to be found, according to an example embodiment.

FIG. 17 illustrates a flowchart of a method 1700 for handling links having remaining bandwidth less than the lowest bandwidth constraint of remaining paths to be found (e.g., zero remaining bandwidth), according to an example embodiment. In the previous embodiments of the method (i.e., methods 300 and 1600) for determining the constrained shortest path in a network, when a node having a higher cost is replaced in the candidate list with a node having a lower cost, the higher cost node is saved. The higher cost node is associated with an alternative longer, albeit more expensive, path from the source to that particular node. These alternative nodes may be used in the embodiment of FIG. 17. The method 1700 may be run after a path from a source to a destination is found. The method 1700 updates the SPT and the candidate to ensure that proposed paths for the remaining destination use links with sufficient available bandwidth. The method 1700 also gives an indication for continuing to compute the constrained shortest paths from the source node to the remaining destination nodes. One indication is to continue to compute the paths from the updated SPT and candidate list. Another indication is to empty the SPT and candidate list before resuming the process of computing the paths. The former indication is called Incremental. The latter is called Initial.

In operation 1705, the routing module 260 determines a link from a previous node p and to a working node x. The link is on a path from the source node to node x, which is represented by a candidate element in the candidate list or on the SPT. Node x is called a far end node of the link since it is farther from the source node than the node p is. Node p is called a near end node of the link since is nearer to the source node than the node x is. In operation 1710, the routing module 260 determines if the available bandwidth of the just determined link is less than the lowest constraint bandwidth. If not, then the method 1700 ends and gives indication Incremental in operation 1715.

If the available link bandwidth is less than the lowest constraint bandwidth, the routing module 260, in operation 1720, determines if an alternative path exists to node x in the candidate list. If no alternative path exists, the node x element and nodes below node x in the SPT and the candidate list are removed from the SPT and the candidate list in operation 1725. For example, the nodes below node x in the SPT may be identified prior to deletion and candidates having previous hope nodes equal to the nodes to be removed from the SPT may be removed from the candidate list. The method 1700 then ends and gives indication Incremental at block 1730.

In operation 1735, if there is an alternative path to node x, the routing module 260 determines if the candidate list includes a candidate with working node x and previous node p. If not, the method 1700 proceeds with the operation 1745. Otherwise, in operation 1740, the candidate having node x as the working node and node p is removed from the candidate list and an alternative candidate representing an alternative path to node x is promoted as a candidate element.

In operation 1745, the routing module 260 determines if the link is in the SPT. Phrased another way, the routing module 260 determines if node x is in the SPT as a child of node p. If the link is not in the SPT, then the method 1700 ends and gives indication Incremental in operation 1765. If the link is in the SPT, then node x and nodes below node x from the candidate list and the SPT are counted. For example, if node x has two child nodes in the SPT and two grandchild nodes, the count is five: one for x plus four for its descendants. In operation 1750, the routing module 260 checks whether the number of nodes below node x is greater than a predetermined threshold number of nodes (e.g., 5 nodes). If the number is not greater than the threshold, the method 1700 ends and gives indication Initial in operation 1755. The threshold may be adjusted (e.g., by an administrator) based on the computational difficulty of determining a path from node x to the other nodes of the SPT relative to the computational difficulty of recomputing paths to the descendant nodes of node x.

If the number of nodes below node x in the SPT is greater than the threshold number, in operation 1760, the routing module 260 finds a constrained shortest path from a node in the SPT that is not below node x to node x. For example, the method 1600 may be used to determine paths from every node present in the SPT that is not below node x to node x. Once a path is found, the SPT is updated to include the path to node x, restoring a connection from the root node to the descendant nodes of node x without recalculating the paths from node x to its descendants. The method 1700 then ends and gives indication Incremental at 1765.

The computation of the paths from the updated SPT and candidate list is continued after all such node x's with the available bandwidth of the link from node p to node x less than the lowest constraint bandwidth are processed with indication Incremental. In some example embodiments, nodes are processed in order of their distance from the source, with closer nodes processed earlier. Once a node x is processed with indication Initial, the computation of the paths is continued from an empty SPT and an initial candidate list containing only one element with source node, cost of zero and bandwidth of a maximum number.

In one embodiment, the threshold number is configured to be a maximum number. In this case, the method 1700 ends and gives indication Initial when node x is on the SPT and there is an alternative path to node x recorded. Thus the computation of the constrained shortest paths from the source node to the destination nodes that are marked as destinations continues from an empty SPT and an initial candidate list containing only one element with the source node, cost of zero, and bandwidth of a maximum number.

Figure 18:
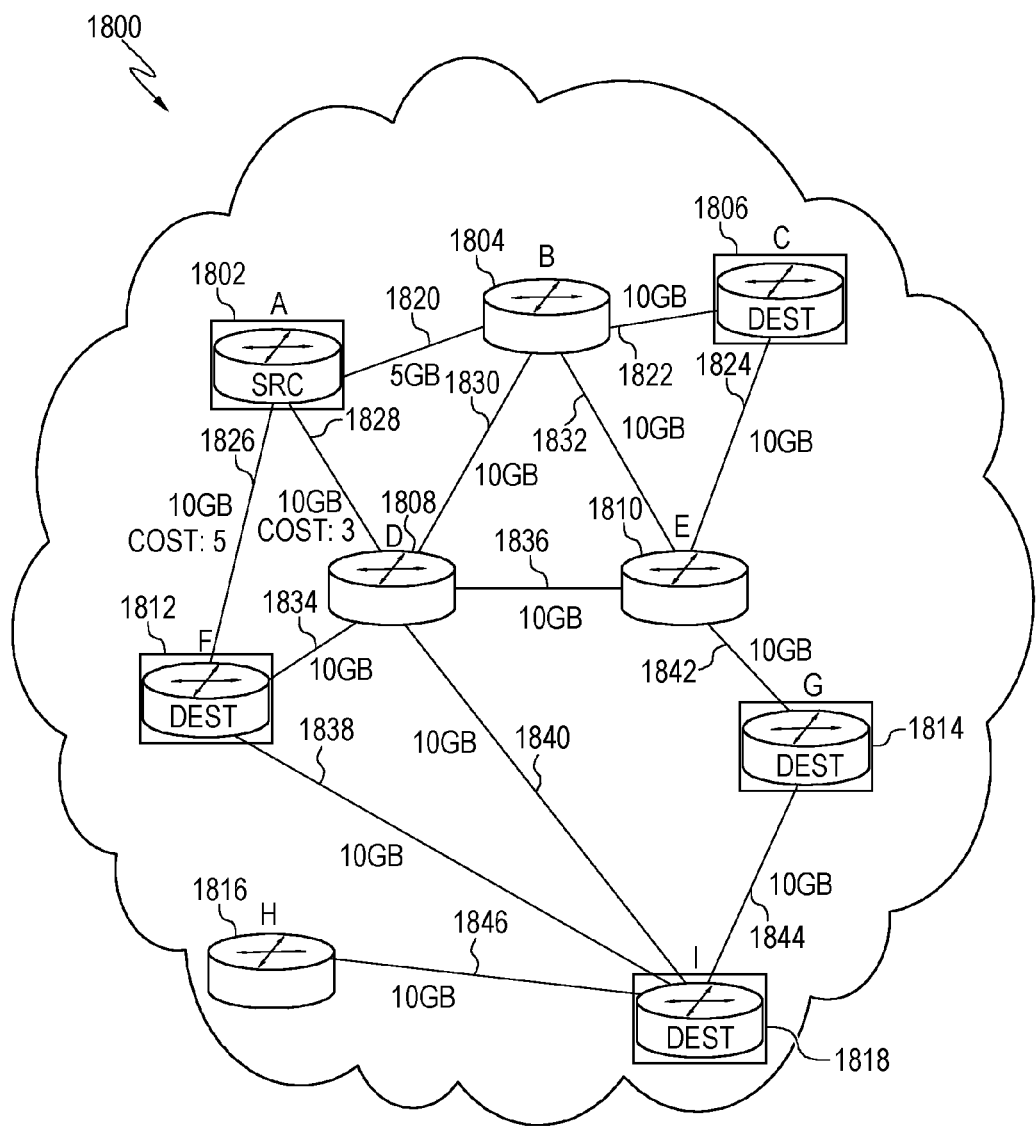
FIG. 18 is a diagram of a network topology for a constrained shortest path determination from one source to each of multiple destinations when the remaining bandwidth of a link is less than the lowest bandwidth constraint, according to an example embodiment.

An example of operation of the embodiment of FIG. 17 is illustrated in the network domain topology of FIG. 18 and the SPT examples of FIGS. 19-30. These figures are for illustration purposes only and do not limit the present embodiments.

FIG. 18 is a diagram of a network topology 1800 for a constrained shortest path determination from one source to each of multiple destinations when the remaining bandwidth of a link is less than the lowest bandwidth constraint, according to an example embodiment. The topology 1800 is for purposes of illustrating the following examples of operation of the method (i.e., methods 300, 1600, 1700) for determining a constrained shortest path and does not limit the embodiments to any one topology. The network topology 1800 includes nodes 1802, 1804, 1806, 1808, 1810, 1812, 1814, 1816, and 1818 and links 1820, 1822, 1824, 1826, 1828, 1830, 1832, 1834, 1836, 1838, 1840, 1842, 1844, and 1846. The nodes 1802-1818 are also labeled with letters A-I and may be referred to by letter instead of number. The nodes A-I may be computers, computer servers, or other types of network nodes. In some example embodiments, the nodes A-I are implemented using a computer system 200, described with respect to FIG. 2.

Each node A-I is coupled to an adjacent node through at least one of the links 1820-1846. Each of the links 1820-1846 has a maximum available bandwidth. Of particular interest are node 1802 (Node A), node 1806 (Node C), node 1812 (Node F), node 1814 (Node G), and node 1818 (Node I). The node 1802 is a source node while the nodes 1806, 1812, 1814, and 1818 are destination nodes.

In the network topology 1800, the initially available link bandwidth from node A to node B (on link 1820) is 5 GB. The remainders of the initially available link bandwidths are 10 GB. Each link cost is 1 except as noted. Thus, the link from node A to node F has a cost of 5 and the link from node A to node D has a cost of 3. Also in this example, the path constraints are 5 GB for each requested path.

Initially, the candidate list is {{A, 0, MaxBW, _}} and the SPT is empty. Nodes C, F, G, and I are marked as destinations. The initial SPT is not shown since it is simply empty.

The first element {A, 0, MaxBW, _} is removed from the candidate list and added to the SPT. For each node x connected to Node A (e.g., nodes B, D and F), consider element {x, Cx, MBx, A} to be added into the candidate list. The updated candidate-list is now:

{{B, 1, 5 GB, A}, {D, 3, 10 GB, A}, {F, 5, 10 GB, A}}.

Figure 19:
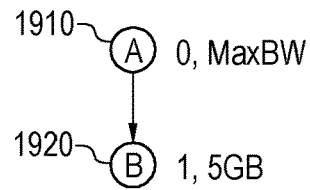
FIGS. 19-30 are updated SPT diagrams in accordance with the embodiment of FIGS. 3, 17, and 18.

The first element {B, 1, 5 G, A} is removed from the candidate list and added to the SPT. FIG. 19 is an updated SPT diagram in accordance with the embodiment of FIGS. 3 and 18. The SPT diagram of FIG. 19 includes an element 1910, representing the node 1802 (node A), and an element 1920, representing the node 1804 (node B). For each node x connected to node B and not an ancestor of node B in the SPT (e.g., nodes C, D, and E), the routing module 260 may generate a new candidate {x, Cx, MBx, B} to be added into the candidate list. The updated candidate list is now:

{{C, 2, 5 GB, B}, {E, 2, 5 GB, B}, {D, 2, 5 GB, B}({D, 3, 10 GB, A}), {F, 5, 10 GB, A}}.

Note that when replacing candidate list element {D, 3, 10 GB, A} with {D, 2, 5 GB, B}, the former is saved under the latter and represented in ({D, 3, 10 GB, A}) following {D, 2, 5 GB, B}.

Figure 20:
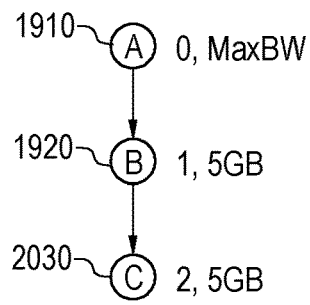

The first element {C, 2, 5 G, B} is removed from the candidate list and added to the SPT. FIG. 20 is the updated SPT diagram in accordance with the embodiment of FIGS.

3 and 18. The SPT diagram of FIG. 20 includes elements 1910, 1920, and 2030. The element 2030 represents the node 1806 (node C).

Node C is marked as a destination node. The 5 GB path from node A to node C has been found (A→B→C). The constrained bandwidth (e.g., 5 GB) is subtracted from the available bandwidth (e.g., 5 GB) on the link from node A to node B. Similarly, the constrained bandwidth (e.g., 5 GB) is subtracted from the available bandwidth (e.g., 10 GB) on the link from node B to node C. The destination mark is removed for node C.

Since the available bandwidth of the link from node A to node B is reduced below the lowest bandwidth constraint of the remaining paths (e.g., the 5 GB constraints of the paths from node A to nodes F, G, and I) and there are no alternative paths to node B from source node A in the candidate list, the candidates for nodes below node B, as determined with reference to the SPT, are removed from the candidate list. Additionally, the nodes and links below node B in the SPT are removed from the SPT (since they cannot be reached via node B).

The updated SPT is now simply node A (not shown) and the updated candidate list is now:
{{D, 3, 10 GB, A}, {F, 5, 10 GB, A}}.

The computation of the remaining paths (i.e., paths to destination nodes G, F and I) continues from the updated SPT and candidate list in accordance with the embodiment of FIGS. 17 and 18.

Note that when removing candidate list element {D, 2, 5 G, B} from the candidate list, the first item under it (i.e., {D, 3, 10 G, A}) is an alternative path to node D from source node A and is moved into the candidate list.

Figure 21:
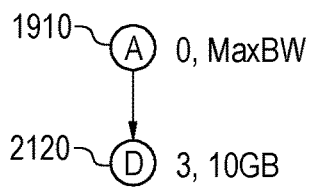

The first element {D, 3, 10 G, A} is removed from the candidate list and added to the SPT. FIG. 21 is the updated SPT diagram in accordance with the embodiment of FIGS. 3 and 18. The SPT diagram of FIG. 21 includes elements 1910 and 2120. The element 2120 represents the node 1808 (node D). For each node x connected to Node D and not an ancestor of node D in the SPT (e.g., nodes B, E, F, and I), consider element {x, Cx, MBx, D} to be added into the candidate list. The updated candidate list is now:
{{F, 4, 10 GB, D}({F, 5, 10 GB, A}), {B, 4, 10 GB, D}, {E, 4, 10 GB, D}, {I, 4, 10 GB, D}}

Figure 22:
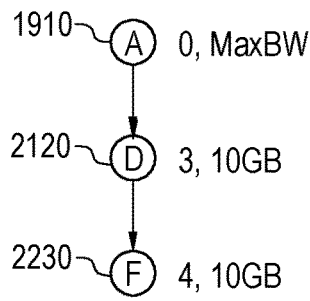

The first element {F, 4, 10G, D} is removed from the candidate list and added to the SPT. FIG. 22 is the updated SPT diagram in accordance with the embodiment of FIGS. 3 and 18. The SPT diagram of FIG. 22 includes elements 1910, 2120, and 2230. The element 2230 represents the node 1812 (node F). The updated candidate list is now:
{{B, 4, 10 GB, D}, {E, 4, 10 GB, D},{I, 4, 10 GB, D}, ({F, 5, 10 GB, A})}

Figure 23:
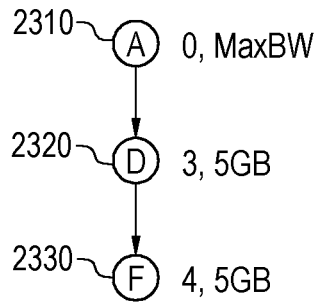

Node F is marked as a destination node. The constrained bandwidth (e.g., 5 GB) is subtracted from the available bandwidth of each of the links of the path from node A to node F (A→D→F). Note that while candidates in the candidate list only store the node of the previous hop, the previous node is in the SPT. Accordingly, the entire path for each candidate can be determined by reference to the SPT in combination with the previous and working node data of the candidate. The destination mark for node F is removed. FIG. 23 is the updated SPT diagram in accordance with the embodiment of FIGS. 3 and 18. The SPT diagram of FIG. 23 includes elements 2310, 2320, and 2330. The element 2310 represents the node 1802 (node A). The element 2320 represents the node 1808 (node D). The element 2330 represents the node 1812 (node F). The updated candidate list is as follows:

{{B, 4, 5 GB, D}, {E, 4, 5 GB, D}, {I, 4, 5 GB, D}, ({F, 5, 10 GB, A})}.

For each node x connected to node F and not an ancestor of node F in the SPT (e.g., node I), consider element {x, Cx, MBx, F} to be added into the candidate list. The updated candidate list is now:
{{B, 4, 5 GB, D}, {E, 4, 5 GB, D}, {I, 4, 5 GB, D}({I, 5, 5 GB, F}), ({F, 5, 10 GB, A})}.

Figure 24:
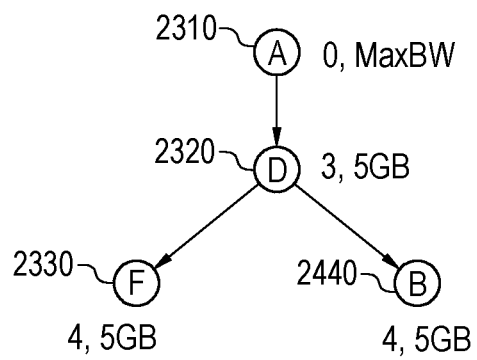

The first element {B, 4, 5 GB, D} is removed from the candidate list and added to the SPT. FIG. 24 is the updated SPT diagram in accordance with the embodiment of FIGS. 3 and 18. The SPT diagram of FIG. 24 includes elements 2310, 2320, 2330, and 2440. The element 2440 represents the node 1804 (node B). For each node x connected to Node B and not an ancestor node in the SPT (e.g., nodes C and E), consider element {x, Cx, MBx, B} to be added into the candidate list. The updated candidate list is now:
{{E, 4, 5 GB, D}({E, 5, 5 GB, B}), {I, 4, 5 GB, D}({I, 5, 5 GB, F}), {C, 5, 5 GB, B}, ({F, 5, 10 GB, A})}

Figure 25:
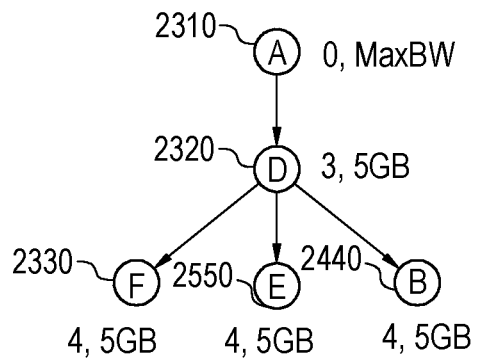

The first element {E, 4, 5 G, D} is removed from the candidate list and added to the SPT. FIG. 25 is the updated SPT diagram in accordance with the embodiment of FIGS. 3 and 18. The SPT diagram of FIG. 25 includes elements 2310, 2320, 2330, 2440, and 2550. The element 2550 represents the node 1810 (node E). For each node x connected to node E and not an ancestor of node E in the SPT (e.g., nodes B, C, and G), consider element {x, Cx, MBx, E} to be added into the candidate list. Since node B is already in the SPT, the candidate for node B via node E is an alternative candidate. The updated candidate list is now:
{{I, 4, 5 GB, D}({I, 5, 5 GB, F}), {C, 5, 5 GB, B}({C, 5, 5 GB, E}), {G, 5, 5 GB, E}, ({F, 5, 10 GB, A}), ({E, 5, 5 GB, B}), ({B, 5, 5 GB, E})}.

Figure 26:
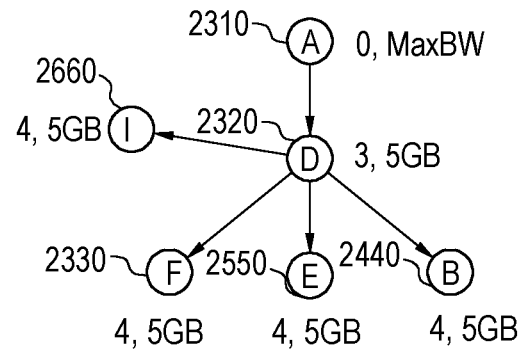

The first element {I, 4, 5 G, D} is removed from the candidate list and added to the SPT. FIG. 26 is the updated SPT diagram in accordance with the embodiment of FIGS. 3 and 18. The SPT diagram of FIG. 26 includes elements 2310, 2320, 2330, 2440, 2550, and 2660. The element 2660 represents the node 1818 (node I).

Node I is marked as a destination node. The path from node A to node I (A→D→I) is found. The constrained bandwidth (e.g., 5 GB) is subtracted from the available bandwidth for each link (e.g., from the link from node A to node D and the link from node D to node I) along the path and the destination mark for node I is removed. Since the available bandwidth of the node A to node D link is 5 GB, the updated bandwidth is 0 GB. In accordance with the embodiment of FIGS. 17 and 18, the updated SPT is now only node A (not shown). The updated candidate list is as follows:
{{F, 5, 10 GB, A}}

Figure 27:
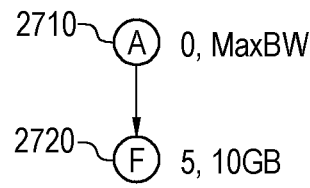

The first element {F, 5, 10 GB, A} is removed from the candidate list and added to the SPT. FIG. 27 is the updated SPT diagram in accordance with the embodiment of FIGS. 3 and 18. The SPT diagram of FIG. 27 includes elements 2710 and 2720. The element 2710 represents the node 1802 (node A) and the element 2720 represents the node 1812 (node F). For each node x connected to node F and not an ancestor of node F in the SPT (e.g., nodes D and I), consider element {x, Cx, MBx, F} to be added to the candidate list. The updated candidate list is now:
{{D, 6, 5 GB, F}, {I, 6, 10 GB, F}}.

Figure 28:
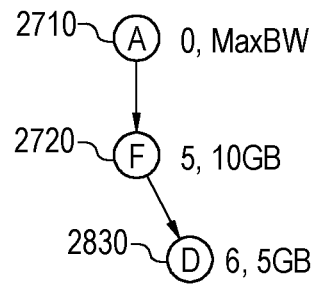

The first element {D, 6, 5 GB, F} is removed from the candidate list and added to the SPT. FIG. 28 is the updated SPT diagram in accordance with the embodiment of FIGS. 3 and 18. The SPT diagram of FIG. 28 includes elements 2710, 2720, and 2830. The element 2830 represents the node 1808 (node D). For each node x connected to node D and not an ancestor of node D in the SPT (e.g., nodes B, E, and I), consider element {x, Cx, MBx, D} to be added into the candidate list. The updated candidate list is now:
{{I, 6, 10 GB, F}({I, 7, 5 GB, D}), {B, 7, 10 GB, D}, {E, 7, 10 GB, D}}.

Figure 29:
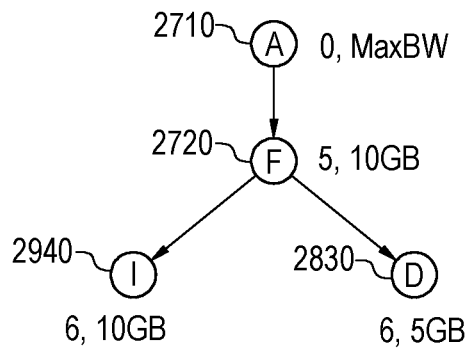

The first element {I, 6, 10 G, F} is removed from the candidate list and added to the SPT. FIG. 29 is the updated SPT diagram in accordance with the embodiment of FIGS. 3 and 18. The SPT diagram of FIG. 29 includes elements 2710, 2720, 2830, and 2940. The element 2940 represents the node 1818 (node I). For each node x connected to node I and not an ancestor node of node I in the SPT (e.g., nodes D, G, and H), consider element {x, Cx, MBx, I} to be added into the candidate list. Since node D is already in the SPT, the candidate having working node D and previous node I is an alternative candidate. The updated candidate list is now:
{{G, 7, 10 GB, I}, {H, 7, 10 GB, I}, {B, 7, 5 G, D}, {E, 7, 5 G, D}, ({D, 7, 5 GB, I}), ({I, 7, 5 GB, D})}.

Figure 30:
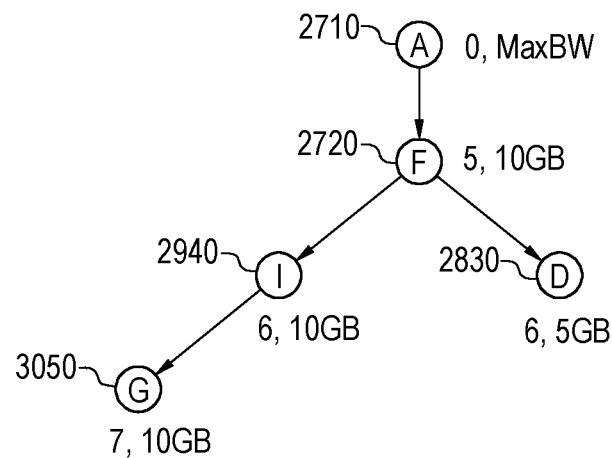

The first element {G, 7, 10 G, I} is removed from the candidate list and added to the SPT. FIG. 30 is the updated SPT diagram in accordance with the embodiment of FIGS. 3 and 18. The SPT diagram of FIG. 30 includes elements 2710, 2720, 2830, 2940, and 3050. The element 3050 represents the node 1814 (node G). Node G is marked as a destination node. A path is found from node A to node G (A→F→I→G). The constrained bandwidth (e.g., 5 GB) is subtracted from the available bandwidth for each link along the path (e.g., from Node A to Node F, Node F to Node I and Node I to Node G). The destination mark for node G is removed. All shortest constrained paths have been found and the method 300 has been completed.

Figure 31:
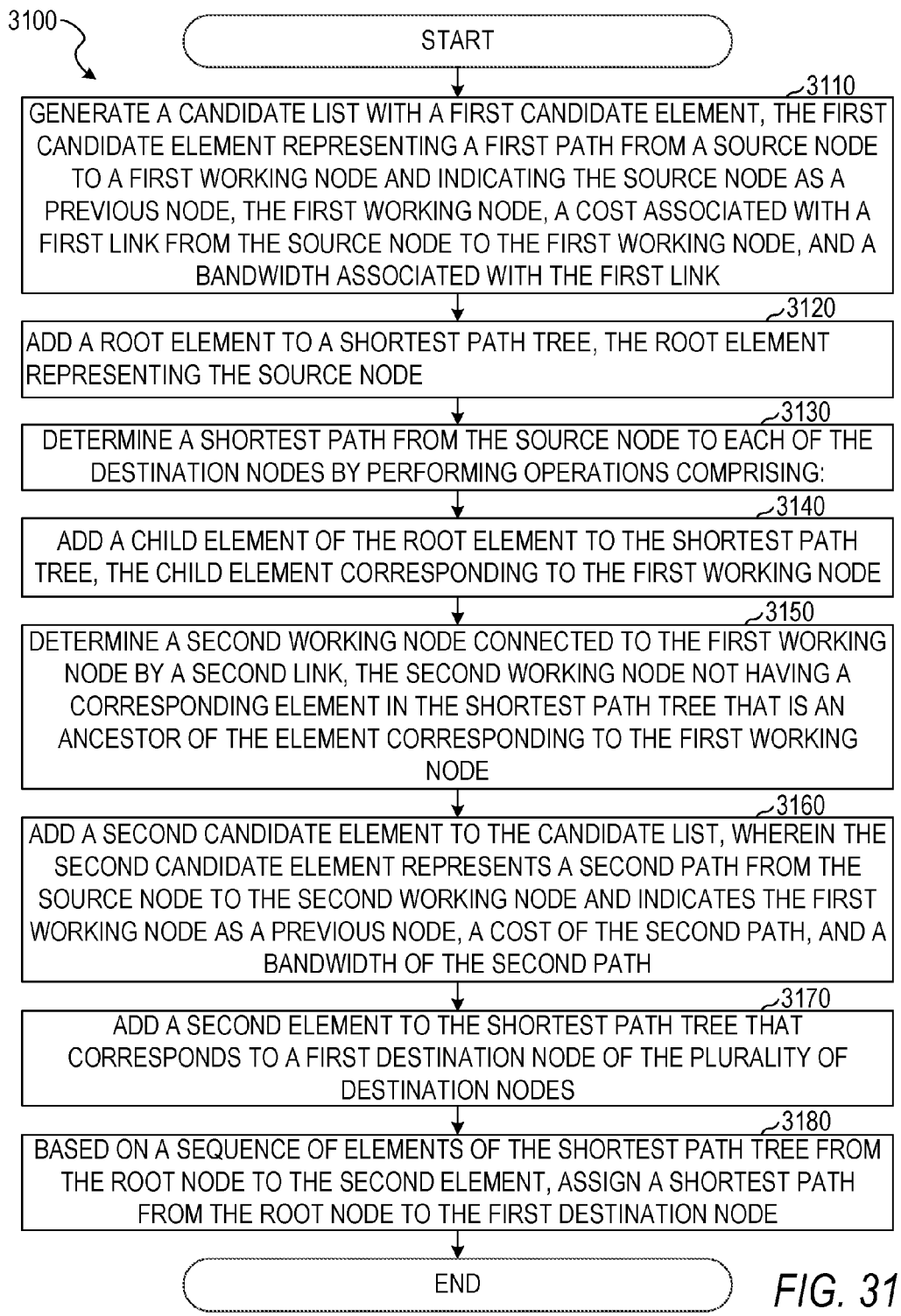
FIG. 31 is a flow chart of a method for determining a constrained shortest path in a network from a source to multiple destinations, according to an example embodiment.

FIG. 31 is a flow chart of a method 3100 for determining a constrained shortest path in a network from a source to multiple destinations, according to an example embodiment. The method 3100 includes operations 3110, 3120, 3130, 3140, 3150, 3160, 3170, and 3180. By way of example and not limitation, the method 3100 is described as being performed by the computer system 200 of FIG. 2.

In operation 3110, the routing module 260 generates a candidate list with a first candidate element that represents a first path from a source node to a first working node. The first candidate element also indicates the source node as a previous node, the first working node, a cost associated with a first link from the source node to the first working node, and a bandwidth associated with the first link. For example, a candidate element of the form {B, 1, 10 GB, A} may be created, where B is an identifier of the first working node, 1 is a cost of the link from A to B, 10 GB is the available bandwidth of the link from A to B, and A is an identifier of the source node.

In operation 3120, the routing module 260 adds a root element to a shortest path tree, the root element representing the source node. For example, a shortest path tree containing a root element representing node A may be created.

In operation 3130, the routing module 260 determines a shortest path from the source node to each of the destination nodes by performing operations comprising operations 3140-3160.

In operation 3140, the routing module 260 adds a child element of the root element to the shortest path tree, the child element corresponding to the first working node. For example, an element corresponding to node B may be added to the shortest path tree as a child of the root node. In some example embodiments, the shortest path tree of FIG. 4 is obtained after this operation.

In operation 3150, the routing module 260 determines a second working node connected to the first working node by a second link. The determined second node does not have a corresponding element in the shortest path tree that is an ancestor of the element corresponding to the first working node. For example, with reference to FIG. 1., nodes A, C, D, and E are connected to node B by links and, of those nodes, only node A has a corresponding element in the SPT that is an ancestor of the element in the SPT that represents node B. Accordingly, the second working node determined in operation 3150 is one of nodes C, D, and E.

In operation 3160, the routing module 260 adds a second candidate element to the candidate list, wherein the second candidate element represents a second path from the source node to the second working node and indicates the first working node as a previous node, a cost of the second path, and a bandwidth of the second path. For example, a candidate element of the form {C, 2, 10 GB, B} may be added to the candidate list.

In operation 3170, the routing module 260 adds a second element to the SPT that corresponds to a first destination node of the plurality of destination nodes. For example, an element representing node C may be added to the SPT as a child element of the element representing node B, resulting in the example SPT of FIG. 5.

In operation 3180, the routing module 260, based on a sequence of elements of the SPT from the root node to the second element, assigns a shortest path from the root node to the first destination node. For example, since the SPT of FIG. 5 shows an element corresponding to node A as a parent of an element corresponding to node B which is a parent of an element corresponding to node C, the routing module 260 may assign a route of A→B→C as a shortest route from the source node A to the destination node C.

Figure 32:
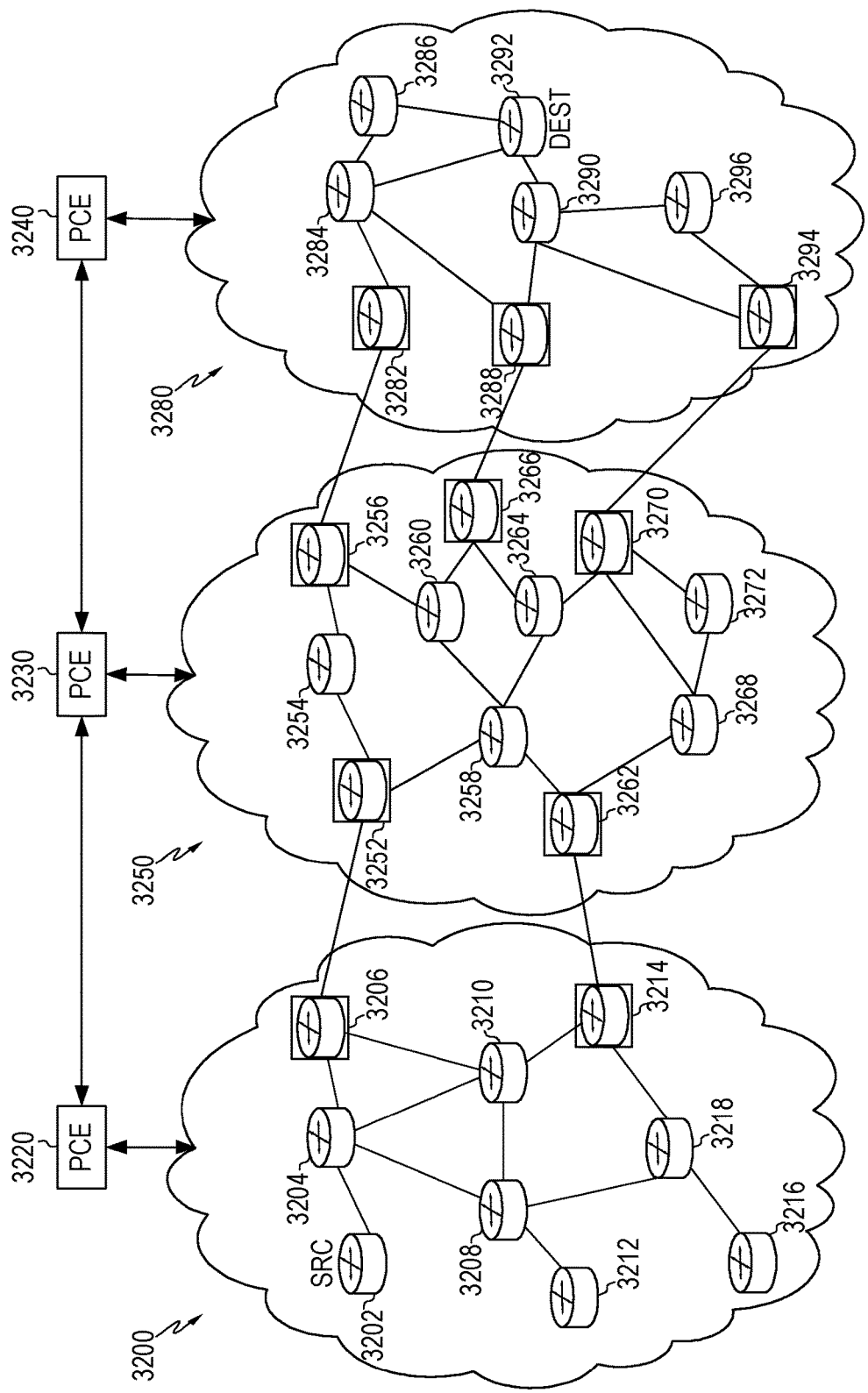
FIG. 32 is a diagram of a network domain topology for a constrained shortest path determination from one source to one destination across multiple domains, according to an example embodiment.

FIG. 32 is a diagram of a network domain topology for a constrained shortest path determination from one source to one destination across multiple domains, according to an example embodiment. FIG. 32 includes a domain 3200, a domain 3250, and a domain 3280. The domain 3200 is associated with the path computation element (PCE) 3220 and includes nodes 3202, 3204, 3206, 3208, 3210, 3212, 3214, 3216, and 3218. The domain 3250 is associated with the PCE 3230 and includes nodes 3252, 3254, 3256, 3258, 3260, 3262, 3264, 3266, 3268, 3270, and 3272. The domain 3280 is associated with the PCE 3240 and includes nodes 3282, 3284, 3286, 3288, 3290, 3292, 3294, and 3296. The nodes 3206, 3214, 3252, 3256, 3262, 3266, 3270, 3282, 3288, and 3294 are boundary nodes that connect to nodes of more than one domain. The node 3202 is a source node. The node 3292 is a destination node.

The methods disclosed herein may be used with backwards-recursive PCE-based computation procedures or with forward search procedures to improve the efficiency of determining a shortest path from a source node (e.g., the source node 3202) to a destination node (e.g., the destination node 3292) across multiple domains (e.g., the domains 3200, 3250, and 3280). In a backwards-recursive PCE-based computation procedure, the path of domains from the source node to the destination node is identified first (e.g., the domain 3200 to the domain 3250 to the domain 3280). Then, a path request is sent to the PCE of the final domain along with the path of domains. The PCE of the final domain determines paths from the boundary nodes of the predecessor domain to the destination node (e.g., paths from the nodes 3256, 3266, and 3270 of the domain 3250 to the destination node 3292) and sends those paths to the PCE of the predecessor domain (e.g., the PCE 3230). For example, the paths {{3256, 3282, 3284, 3292}, {3266, 3288, 3290, 3292}, {3270, 3294, 3290, 3292}} may be generated by the PCE 3240.

The PCE of each intermediate domain on the domain path performs the same steps, determining paths from the boundary nodes of the predecessor domain to the destination node. For example, the paths {{3206, 3252, 3254, 3256, 3282, 3284, 3292}, {3214, 3262, 3268, 3270, 3294, 3290, 3292}} may be generated by the PCE 3230.

The PCE of the domain of the source node determines paths from the source node to the boundary nodes and selects the path to use (e.g., the shortest path, the path with the highest bandwidth, the path with the lowest cost, or any suitable combination thereof). For example, the path {3202, 3204, 3206, 3252, 3254, 3256, 3282, 3284, 3292} may be selected by the PCE 3220 for use in transmitting data from the source node 3202 to the destination node 3292.

Within each domain, the paths determined by the PCEs may be generated partially or entirely using the simultaneous constrained shortest path methods described herein. For example, in the domain 3280, the three paths from the boundary nodes to the destination node may be computed simultaneously. As another example, in the domain 3250, in which shortest paths need to be computed from the boundary nodes 3206 and 3214 to the boundary nodes 3256, 3266, and 3270, paths from node 3206 to each of nodes 3256, 3266, and 3270 may be computed in one application of the methods and paths from node 3214 to each of nodes 3256, 3266, and 3270 in another application of the methods. By contrast, using prior art path-finding methods, each of the six paths would be found independently, at greater computational cost.

Figure 33:
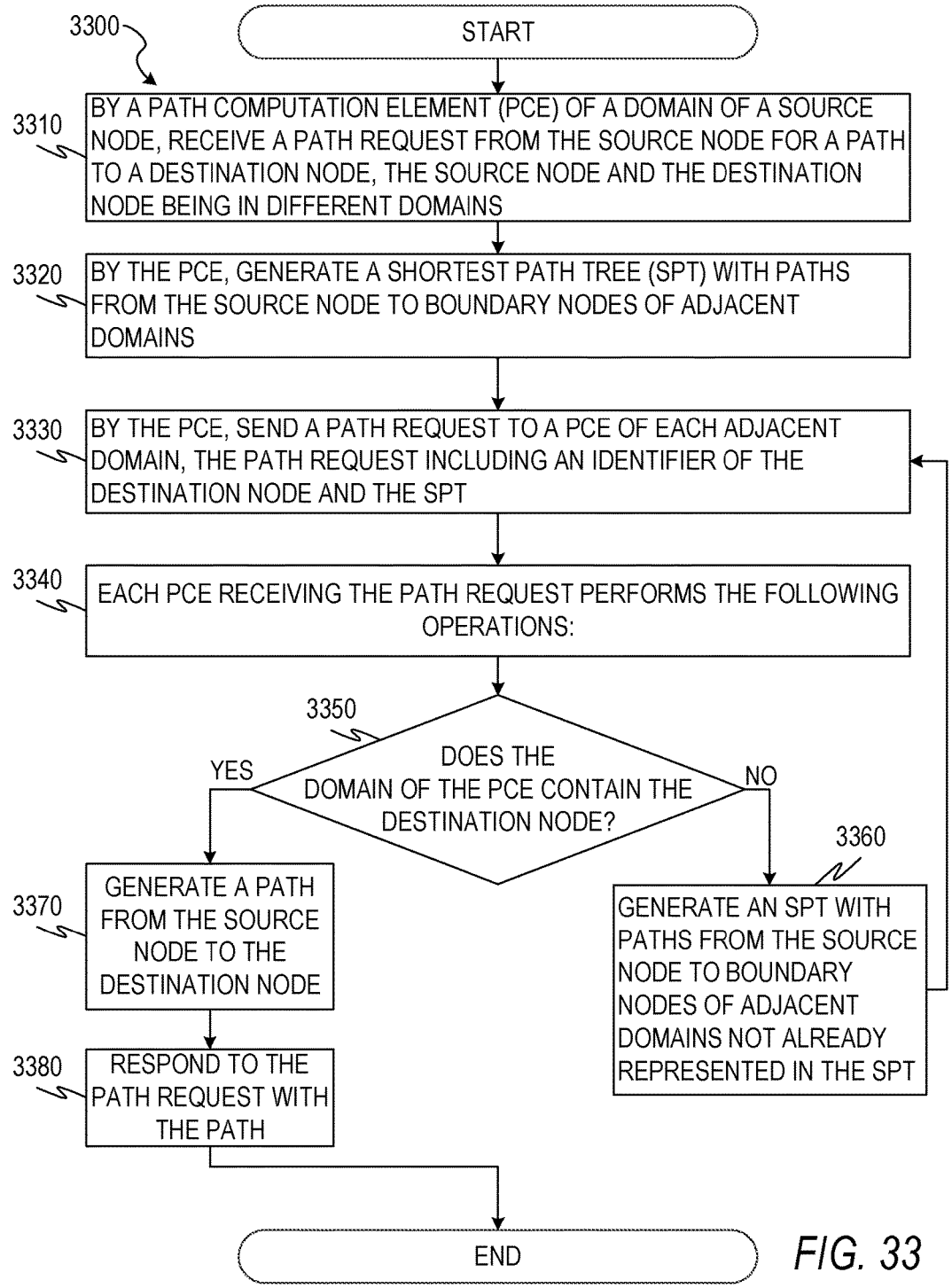
FIG. 33 is a flow chart of a method for determining a constrained shortest path in a network from one source to one destination across multiple domains, according to an example embodiment.

FIG. 33 is a flow chart of a method 3300 for determining a constrained shortest path in a network from one source to one destination across multiple domains, according to an example embodiment. The method 3300 includes operations 3310, 3320, 3330, 3340, 3350, 3360, 3370, and 3380. By way of example and not limitation, the method 3300 is described as being implemented by PCEs of FIG. 32, implemented using computers 200 of FIG. 2. The method 3300 is an example of a forward-search procedure.

In operation 3310, the routing module 260 of a PCE of a domain of a source node (e.g., the PCE 3220 of the domain 3200 of the source node 3202) receives a path request from the source node for a path to a destination node (e.g., the destination node 3292), the source node and the destination node being in different domains.

In operation 3320, the routing module 260 of the PCE (e.g., the PCE 3220) generates an SPT with paths from the source node to boundary nodes of adjacent domains. For example, the methods 300 and 1700 may be used to generate paths from the source node 3202 to the boundary nodes 3252 and 3262 of the domain 3250.

In operation 3330, the routing module 260 of the PCE sends a path request to a PCE of each adjacent domain, the path request including an identifier of the destination node and the SPT. For example, the PCE 3220 may send a path request to the PCE 3230 that includes an identifier of the destination node 3292 and the SPT that includes paths from the source node 3202 to the boundary nodes 3252 and 3262. As an example, the SPT may indicate the following paths: {{3202, 3204, 3206, 3252}, {3202, 3204, 3210, 3214, 3262}}.

Though FIG. 32 shows one domain (domain 3250) adjacent to the domain of the source node (domain 3200), additional domains may be present. As indicated in operation 3340, operation 3350 and appropriate ones of operations 3360, 3370, 3380 and 3330 are performed by each PCE receiving a path request.

In operation 3350, the PCE determines if its associated domain contains the destination node. If the associated domain (e.g., the domain 3280 associated with the PCE 3230) does not contain the destination node (e.g., the destination node 3292), the method 3300 continues with operation 3360.

In operation 3360, the PCE generates an SPT with paths from the source node to boundary nodes of adjacent domains not already represented in the SPT. In the example topology of FIG. 32, the domains 3200 and 3280 are connected to (and thus adjacent to) the domain 3250. However, the SPT already contains nodes from the domain 3200 (e.g., the source node 3202). Accordingly, the PCE 3230 generates an SPT with paths from the source node 3202 to the boundary nodes of the domain 3280 (e.g., the boundary nodes 3282, 3288, and 3294). The methods 300 and 1700 may be used in a first iteration to determine constrained paths from the boundary node 3252 to the boundary nodes 3282, 3288, and 3294. The methods 300 and 1700 may be used in a second iteration to determine constrained paths from the boundary node 3262 to the boundary nodes 3283, 3288, and 3294. Thus, the PCE generates n×m possible paths, where n is the number of boundary nodes coming into the domain of the PCE from the previous domain and m is the number of boundary nodes of adjacent domains not already represented in the SPT. In this example, the PCE 3230 generates six possible paths, two for each boundary node of the domain 3280.

The paths through the domain of the PCE may be added to the SPT, so that the SPT includes paths from the source node to the boundary nodes of the adjacent domains. The paths having the same end node are compared and only one path is retained in the SPT. The retained path may be selected as having the lowest cost, fewest number of hops, highest available bandwidth, or any suitable combination thereof. After retaining only one path for each end node, the resulting SPT has m paths. For example, the SPT generated by the PCE 3230 may indicate the paths {{3202, 3204, 3206, 3252, 3254, 3256, 3282}, {3202, 3204, 3206, 3252, 3258, 3260, 3266, 3288}, {3202, 3204, 3210, 3214, 3262, 3268, 3270, 3294}}.

After completing operation 3360, the PCE proceeds with operation 3330, sending a path request to the PCE of the adjacent domains (e.g., the PCE 3240 of the domain 3280). The receiving PCE determines, in operation 3350, if its domain (e.g., the domain 3280 associated with the PCE 3240) contains the destination node (e.g., the node 3292). If the domain does not contain the destination node, the method 3300 continues with operations 3360 and 3330, as described above. If the domain does contain the destination node, the method 3300 continues with operation 3370.

In operation 3370, the PCE of the domain containing the destination node generates a path from the source node to the destination node. For example, the methods 1600 and 1700 may be used to generate candidate paths through the domain 3280 from the boundary nodes 3282, 3288, and 3294 to the destination node 3292. The candidate paths through the domain 3280 may be added to the SPT generated by the previous PCE to generate candidate paths from the source node 3202 to the destination node 3292. For example, the candidate paths may be {{3202, 3204, 3206, 3252, 3254, 3256, 3282, 3284, 3292}, {3202, 3204, 3206, 3252, 3258, 3260, 3266, 3288, 3290, 3292}, {3202, 3204, 3210, 3214, 3262, 3268, 3270, 3294, 3290, 3292}}. The PCE selects one of the candidate paths. The path may be selected based on criteria such as cost, number of hops, available bandwidth, or any suitable combination thereof.

In operation 3380, the PCE responds to the path request with the path. For example, the PCE 3240 may respond to the path request from the PCE 3230 with the path. On receiving the path, the PCE 3230 may respond to the path request it received from the PCE 3220 with the path. The PCE 3220 may, in response, provide the path to the source node 3202. The source node 3202 may use the path to communicate with the destination node 3292.

Figure 34:
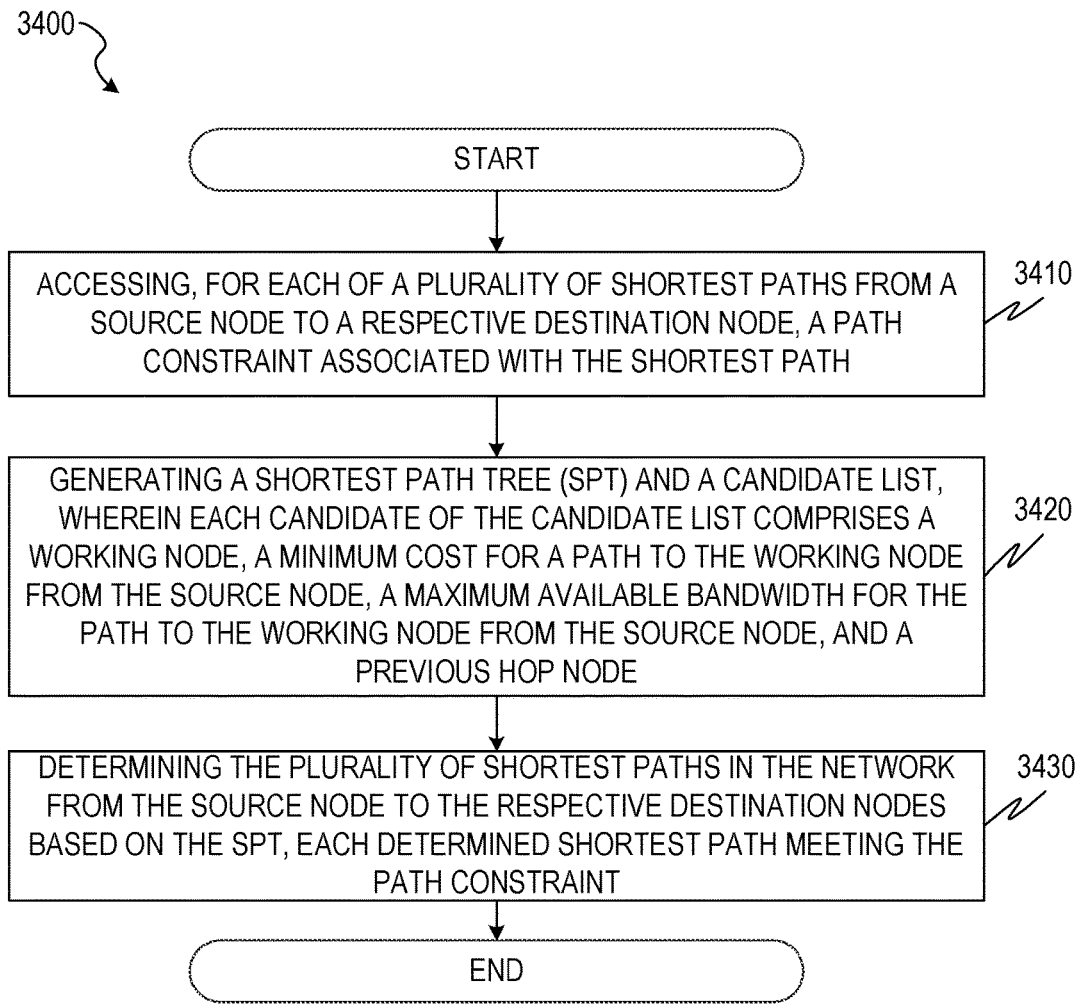
FIG. 34 is a flow chart of a method for determining a constrained shortest path in a network from one source to one destination across multiple domains, according to an example embodiment.

FIG. 34 is a flow chart of a method 3400 for determining a constrained shortest path in a network from a source to multiple destinations, according to an example embodiment. The method 3400 includes operations 3410, 3420, and 3430. By way of example and not limitation, the method 3400 is described as being performed by the computer system 200 of FIG. 2.

In operation 3410, the routing module 260 accesses, for each of a plurality of shortest paths from a source node to a respective destination node, a path constraint associated with the respective shortest path. For example, the source node may have requested the paths to the destination nodes and provided a path constraint for each requested path.

In operation 3420, the routing module 260 generates an SPT and a candidate list, wherein each candidate of the candidate list comprises a working node, a minimum cost for a path to the working node from the source node, a maximum available bandwidth for the path to the working node from the source node, and a previous hop node. For example, an SPT similar to those depicted in FIGS. 4-14 and 19-30 may be created, along with a candidate list similar to those described above with respect to FIGS. 3-30. In operation 3430, the routing module 260 determines the plurality of shortest paths in the network from the source node to each of the destination nodes based on the SPT, each determined shortest path meeting the path constraint for the shortest path. In some example embodiments, operation 3430 is performed using one or more of methods 300, 1600, 1700, 3100, and 3300.

Although a few embodiments have been described in detail above, other modifications are possible. For example, the logic flows depicted in the figures do not require the particular order shown, or sequential order, to achieve desirable results. Other steps may be provided, or steps may be eliminated, from the described flows, and other components may be added to, or removed from, the described systems. Other embodiments may be within the scope of the following claims.

What is claimed is:

1. A computer-implemented method for determining a plurality of shortest paths in a network from a source node to respective destination nodes, comprising:
   accessing, by one or more processors, for each of the plurality of shortest paths, a path constraint;
   generating, by the one or more processors, a shortest path tree (SPT) and a candidate list, wherein each candidate of the candidate list comprises a working node, a minimum cost for a path to the working node from the source node, a maximum available bandwidth for the path to the working node from the source node, and a previous hop node; and
   determining, by the one or more processors, the plurality of shortest paths in the network from the source node to the respective destination nodes based on the SPT and the candidate list, each determined shortest path meeting the path constraint.

2. The method of claim 1, wherein a first candidate of the candidate list comprises:
   a first working node that is a first node in the network connected to a second node in the network through a link that is in the SPT;
   a minimum cost to the first working node from the source node that is a minimum cost to the second node plus a cost of the link;
   a maximum available bandwidth for the path to the first working node from the source node that is the lesser of an available bandwidth of the link and a maximum available bandwidth to the second node; and
   a first previous hop node that is the second node.

3. The method of claim 2, wherein:
   the SPT is initially empty;
   the candidate list initially comprises an initial candidate; and
   the initial candidate comprises:
      a second working node that is the source node;
      a minimum cost to the second working node from the source node that is zero;
      a maximum available bandwidth for the path to the second working node from the source node that is a maximum number in a computer; and
      a second previous hop node that is none.

4. The method of claim 1, further comprising:
   for each of the destination nodes, adding a destination mark to a data structure corresponding to the destination node; and
   selecting a lowest constraint from the path constraints.

5. The method of claim 4, wherein:
   the path constraints are bandwidth constraints; and
   selecting the lowest constraint from the path constraints comprises selecting the lowest bandwidth constraint from among the bandwidth constraints.

6. The method of claim 5, further comprising:
   removing the destination mark from the data structure corresponding to a destination node when a shortest path from the source node to the destination node having the destination mark is found and satisfies the constraint for the shortest path;
   updating a data structure that represents available bandwidth of each link along the shortest path from the source node to the destination node by subtracting the bandwidth constraint for the shortest path from the available bandwidth of the link;
   determining that a link of the links along the shortest path from the source node to the destination node has an available bandwidth less than the lowest bandwidth constraint; and
   based on the determination that the link has the available bandwidth less than the lowest bandwidth constraint, setting the shortest path tree to empty and the candidate list to have only one element corresponding to the source node.

7. The method of claim 4, wherein the determining of the plurality of shortest paths in the network from the source node to the respective destination nodes is based on a third candidate being added into the SPT that contains a third working node with the destination mark and the path constraint for a shortest path from the source node to the third working node being satisfied.

8. The method of claim 1, wherein:
   the SPT represents a plurality of links between a plurality of sources and a destination; and
   each of the plurality of sources is marked as a destination.

9. The method of claim 1, further comprising:
selecting a candidate from the candidate list, wherein the candidate selected has a minimum cost that is a lowest value among the minimum costs of candidates in the candidate list;
removing the selected candidate from the candidate list; and
adding the working node of the selected candidate into the SPT.

10. The method of claim 9, further comprising:
updating the candidate list by:
for each node that is connected by a link to the added node in the SPT and is not an ancestor of the added node in the SPT:
constructing a new candidate with:
the respective node as the working node,
the added node as the previous hop node,
the minimum cost to the added node from the source node plus a cost of a link from the added node to the working node as the minimum cost for the path to the working node from the source node, and
the smaller of an available bandwidth of the link to the working node from the added node and the maximum bandwidth to the added node from the source node as the maximum bandwidth to the working node; and
adding the new candidate into the candidate list unless there is an existing candidate with said node as the working node in the candidate list.

11. The method of claim 10, wherein the updating of the candidate list further comprises:
replacing the existing candidate with the new candidate and storing the existing candidate as an alternative under the new candidate when the existing candidate with the node is in the candidate list and the cost to the node of the new candidate is less than that of the existing candidate; and
saving the new candidate as an alternative path under the existing candidate when the existing candidate with the node is in the candidate list and the cost to the node of the new candidate is not less than that of the existing candidate.

12. The method of claim 5, further comprising:
based on a determination that a link between a first node and a second node in the SPT has an available bandwidth less than the lowest bandwidth constraint:
removing, from the SPT, a set of nodes composed of the second node and each node descended the second node;
removing, from the candidate list, a candidate with a third previous hop node in the set of nodes; and
promoting, in the candidate list, an alternative candidate for the removed candidate to a new candidate.

13. The method of claim 5, further comprising:
maintaining a maximum reserved link bandwidth (MRLB), initially set to zero; and
maintaining a minimum available link bandwidth (MALB), initially set to a maximum number.

14. The method of claim 13, further comprising:
in response to finding a shortest path with an associated bandwidth constraint that identifies a bandwidth, increasing the MRLB by the bandwidth of the associated bandwidth constraint;
in response to adding a candidate to the candidate list, setting the MALB to the smaller of the maximum available bandwidth for the path to the working node of the added candidate and the MALB; and
in response to determining that the MRLB plus a bandwidth of the lowest bandwidth constraint is greater than the MALB, reducing an available bandwidth of links along each shortest path found by the path constraint bandwidth for the path.

15. The method of claim 1, wherein:
the generating of the candidate list comprises generating the candidate list with a first candidate element, wherein the working node of the first candidate element is a first node connected to the source node by a first link, the minimum cost for the path to the working node from the source node is a cost associated with the first link, the maximum available bandwidth for the path to the working node from the source node is a bandwidth associated with the first link, and the previous hop node is the source node;
the generating of the SPT comprises adding a root element to the SPT, the root element representing the source node; and
the determining of the shortest paths in the network from the source node to the destination nodes comprises:
removing the first candidate element from the candidate list;
adding a first element to the SPT as a child element of the root element, the first element corresponding to the first node;
determining a second node connected to the first node by a second link, the second node not having a corresponding element in the SPT that is an ancestor of the first element;
adding a second candidate element to the candidate list, wherein the working node is the second node and the previous hop node is the first node;
adding a second element to the SPT that corresponds to a first destination node of the destination nodes; and
based on a sequence of elements of the SPT from the root element to the second element, assigning a shortest path from the root element to the first destination node.

16. A system for determining a plurality of shortest paths in a network from a source node to respective destination nodes, comprising:
a non-transitory memory storage comprising instructions; and
one or more processors in communication with the memory storage and a plurality of network nodes, wherein the one or more processors execute the instructions to:
accessing, for each of the plurality of shortest paths, a path constraint;
generating a shortest path tree (SPT) and a candidate list, wherein each candidate of the candidate list comprises a working node, a minimum cost for a path to the working node from the source node, a maximum available bandwidth for the path to the working node from the source node, and a previous hop node; and
determining the plurality of shortest paths in the network from the source node to the respective destination nodes based on the SPT and the candidate list, each determined shortest path meeting the path constraint.

17. The system of claim 16, wherein a first candidate of the candidate list comprises:

a first working node that is a first node in the network connected to a second node in the network through a link that is in the SPT;
a minimum cost to the first working node that is a minimum cost to the second node plus a cost of the link;
a maximum available bandwidth for the path to the first working node from the source node that is the lesser of an available bandwidth of the link and a maximum available bandwidth to the second node; and
a first previous hop node that is the second node.

18. The system of claim 17, wherein:
the SPT is initially empty;
the candidate list initially comprises an initial candidate; and
the initial candidate comprises:
  a second working node is that the source node;
  a minimum cost to the second working node that is zero;
  a maximum available bandwidth that is a maximum number in a computer; and
  a second previous hop node that is none.

19. The system of claim 16, wherein the one or more processors further perform:

for each of the destination nodes, adding a destination mark to a data structure corresponding to the destination node; and
selecting a lowest constraint from the path constraints.

20. A non-transitory computer-readable media storing computer instructions for determining a plurality of shortest paths in a network from a source node to respective destination nodes, that when executed by one or more processors, cause the one or more processors to perform the steps of:
accessing, for each of the plurality of shortest paths, a path constraint;
generating a shortest path tree (SPT) and a candidate list, wherein each candidate of the candidate list comprises a working node, a minimum cost for a path to the working node from the source node, a maximum available bandwidth for the path to the working node from the source node, and a previous hop node; and
determining the plurality of shortest paths in the network from the source node to the respective destination nodes based on the SPT and the candidate list, each determined shortest path meeting the path constraint.

* * * * *